United States Patent
Lei et al.

(10) Patent No.: US 10,425,641 B2
(45) Date of Patent: Sep. 24, 2019

(54) QUANTIZATION OFFSET AND COST FACTOR MODIFICATION FOR VIDEO ENCODING

(71) Applicant: Intel Corporation, Santa Clara, CA (US)

(72) Inventors: Zhijun Ryan Lei, Portland, OR (US); Sang-hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 14/779,906

(22) PCT Filed: May 9, 2014

(86) PCT No.: PCT/US2014/037532
§ 371 (c)(1),
(2) Date: Sep. 24, 2015

(87) PCT Pub. No.: WO2014/193630
PCT Pub. Date: Dec. 4, 2014

(65) Prior Publication Data
US 2016/0057418 A1 Feb. 25, 2016

Related U.S. Application Data

(60) Provisional application No. 61/828,985, filed on May 30, 2013.

(51) Int. Cl.
*H04N 19/124* (2014.01)
*H04N 19/159* (2014.01)
(Continued)

(52) U.S. Cl.
CPC ......... *H04N 19/124* (2014.11); *H04N 19/126* (2014.11); *H04N 19/136* (2014.11);
(Continued)

(58) Field of Classification Search
CPC .. H04N 19/124; H04N 19/182; H04N 19/176; H04N 19/60
(Continued)

(56) References Cited

U.S. PATENT DOCUMENTS 7,471,724 B2   12/2008   Lee
2007/0140334 A1   6/2007   Sun
(Continued)

OTHER PUBLICATIONS

International Searching Authority, "International Preliminary Report on Patentability", issued in connection with International Application No. PCT/US2014/037532, dated Dec. 1, 2015 (10 pages).
(Continued)

*Primary Examiner* — On S Mung
(74) *Attorney, Agent, or Firm* — Hanley, Flight & Zimmerman, LLC

(57) ABSTRACT

Methods, apparatus, systems and articles of manufacture to perform quantization offset and/or cost factor modification for video encoding are disclosed. Some example methods for video encoding disclosed herein include adjusting a quantization offset to quantize a transform coefficient representative of a pixel block in a frame of a video sequence. For example, the quantization offset can be adjusted based on a quantization parameter obtained to quantize the transform coefficient. Some such example methods also include quantizing the transform coefficient according to the quantization parameter and the quantization offset. Some example methods for video encoding disclosed herein additionally or alternatively include adjusting a cost factor based on a characteristic of a pixel block in a frame of a video sequence. Some such example methods also include determining, based on the cost factor, a cost associated with encoding the pixel block according to a first encoding mode.

23 Claims, 13 Drawing Sheets

(51) Int. Cl.
  *H04N 19/176*  (2014.01)
  *H04N 19/126*  (2014.01)
  *H04N 19/136*  (2014.01)
  *H04N 19/14*   (2014.01)
  *H04N 19/137*  (2014.01)
  *H04N 19/19*   (2014.01)
  *H04N 19/182*  (2014.01)
  *H04N 19/60*   (2014.01)

(52) U.S. Cl.
  CPC ........... *H04N 19/137* (2014.11); *H04N 19/14* (2014.11); *H04N 19/159* (2014.11); *H04N 19/176* (2014.11); *H04N 19/182* (2014.11); *H04N 19/19* (2014.11); *H04N 19/60* (2014.11)

(58) Field of Classification Search
  USPC .................................................... 375/240.03
  See application file for complete search history.

(56) References Cited

U.S. PATENT DOCUMENTS

| | | |
|---|---|---|
| 2008/0112481 A1 | 5/2008 | Hsaing et al. |
| 2012/0219055 A1 | 8/2012 | He et al. |
| 2013/0114701 A1 | 5/2013 | Lim et al. |
| 2013/0272390 A1* | 10/2013 | Joshi ................ H04N 19/00006 375/240.03 |

OTHER PUBLICATIONS

International Searching Authority, "International Search Report and Written Opinion", issued in connection with International Patent Application No. PCT/US2014/037532, dated Sep. 1, 2014 (14 pages).

* cited by examiner

| Resolution | RoundingIntra (rounding offset) | | | | | | | |
|---|---|---|---|---|---|---|---|---|
| | 1q/16 | 2q/16 | 3q/16 | 4q/16 | 5q/16 | 6q/16 | 7q/16 | 8q/16 |
| QCIF | 0 | 0.205 | 0.421 | 0.614 | 0.783 | 0.846 | 0.748 | 0.361 |
| CIF | 0 | 0.198 | 0.405 | 0.593 | 0.757 | 0.826 | 0.743 | 0.388 |
| SD | 0 | 0.195 | 0.398 | 0.58 | 0.742 | 0.81 | 0.748 | 0.427 |
| 720p | 0 | 0.173 | 0.352 | 0.511 | 0.648 | 0.704 | 0.632 | 0.327 |
| 1080p | 0 | 0.177 | 0.357 | 0.515 | 0.655 | 0.719 | 0.68 | 0.415 |

| Resolution | RoundingInterP (rounding offset) | | | | | | | |
|---|---|---|---|---|---|---|---|---|
| | q/16 | 2q/16 | 3q/16 | 4q/16 | 5q/16 | 6q/16 | 7q/16 | 8q/16 |
| QCIF | 0 | 0.084 | 0.141 | 0.163 | 0.127 | 0.016 | -0.231 | -0.771 |
| CIF | 0 | 0.102 | 0.184 | 0.239 | 0.251 | 0.194 | 0.024 | -0.361 |
| SD | 0 | 0.086 | 0.157 | 0.204 | 0.22 | 0.177 | 0.048 | -0.247 |
| 720p | 0 | 0.073 | 0.13 | 0.162 | 0.157 | 0.085 | -0.082 | -0.426 |
| 1080p | 0 | 0.052 | 0.096 | 0.12 | 0.116 | 0.064 | -0.063 | -0.324 |

| | [P=3q/16, B=3q/16] | [P=3q/16, B=q/16] | [P=4q/16, B=q/16] | [P=4q/16, B=2q/16] | [P=4q/16, B=3q/16] | [P=4q/16, B=4q/16] | [P=4q/16, B=5q/16] | [P=4q/16, B=6q/16] | [P=4q/16, B=7q/16] | [P=4q/16, B=8q/16] |
|---|---|---|---|---|---|---|---|---|---|---|
| QCIF | 0 | 0.203 | 0.224 | 0.156 | 0.06 | -0.081 | -0.298 | -0.671 | -1.359 | -2.459 |
| CIF | 0 | 0.173 | 0.227 | 0.171 | 0.08 | -0.033 | -0.219 | -0.514 | -0.997 | -1.754 |
| SD | 0 | 0.095 | 0.14 | 0.114 | 0.07 | -0.005 | -0.129 | -0.332 | -0.673 | -1.208 |
| 720p | 0 | 0.095 | 0.124 | 0.099 | 0.056 | -0.017 | -0.14 | -0.339 | -0.662 | -1.159 |
| 1080p | 0 | 0.057 | 0.08 | 0.066 | 0.039 | -0.011 | -0.096 | -0.24 | -0.49 | -0.896 |

QUANTIZATION OFFSET AND COST FACTOR MODIFICATION FOR VIDEO ENCODING

RELATED APPLICATION(S)

This patent claims the benefit of and priority from U.S. Provisional Application Ser. No. 61/828,985, entitled "QUANTIZATION OR ROUNDING FACTOR MODIFICATION FOR VIDEO ENCODING" and filed on May 30, 2013. U.S. Provisional Application Ser. No. 61/828,985 is hereby incorporated by reference in its entirety.

FIELD OF THE DISCLOSURE

This disclosure relates generally to video encoding and, more particularly, to quantization offset and/or cost factor modification for video encoding.

BACKGROUND

Modern video encoders typically compress video data for transmission to increase the amount of video-related information able to be conveyed in a given communication bandwidth. The resulting encoded video signal can then be transmitted to a receiver having a suitable video decoder capable of decompressing and/or otherwise decoding the video signal for display on an appropriate display device. Quantization is one such technique that can be used in the compression process. In video data quantization, an input range of the video data is quantized to generate a number of discrete levels such that quantized video data generally takes on fewer possible values than the input video data. As a result, quantization can reduce the precision of the video data being encoded, which can thereby reduce the number of bits required for encoding the video data.

Some video encoders are able to implement several different types of video encoding techniques, one or more of which may also have different encoding modes. For example, a video encoder can implement both intra-frame encoding, in which a pixel block of a given video frame is encoded using pixels from one or more neighboring blocks of the same frame as predictors, and inter-frame encoding, in which a pixel block of a given frame is encoded using pixels from one or more different frames as predictors. Additionally, one or both of the intra-frame and inter-frame encoding techniques employed by a video encoder may have different encoding modes corresponding to, for example, the type of block partitioning (e.g., partitioning into blocks of 16×16 pixels, 8×8 pixels, 4×4 pixels, etc.) employed by the particular encoding technique, the direction (e.g., up, left, etc.) from which pixel predictors are chosen relative to the given block to be encoded, etc. A video encoder employing different types of encoding techniques having different modes may use a cost function to calculate costs associated with the different techniques/modes to thereby permit selection of a particular encoding technique/mode having the "best" cost. Some such cost functions may also factor in other compression techniques employed by the video encoder, such as quantization, when determining the costs of the different encoding techniques/modes.

BRIEF DESCRIPTION OF THE DRAWINGS

FIGS. 5-10 illustrate example performance results for the example video encoder of FIG. 1 implemented with the example transformer and quantizer of FIG. 2.

Figure 1:
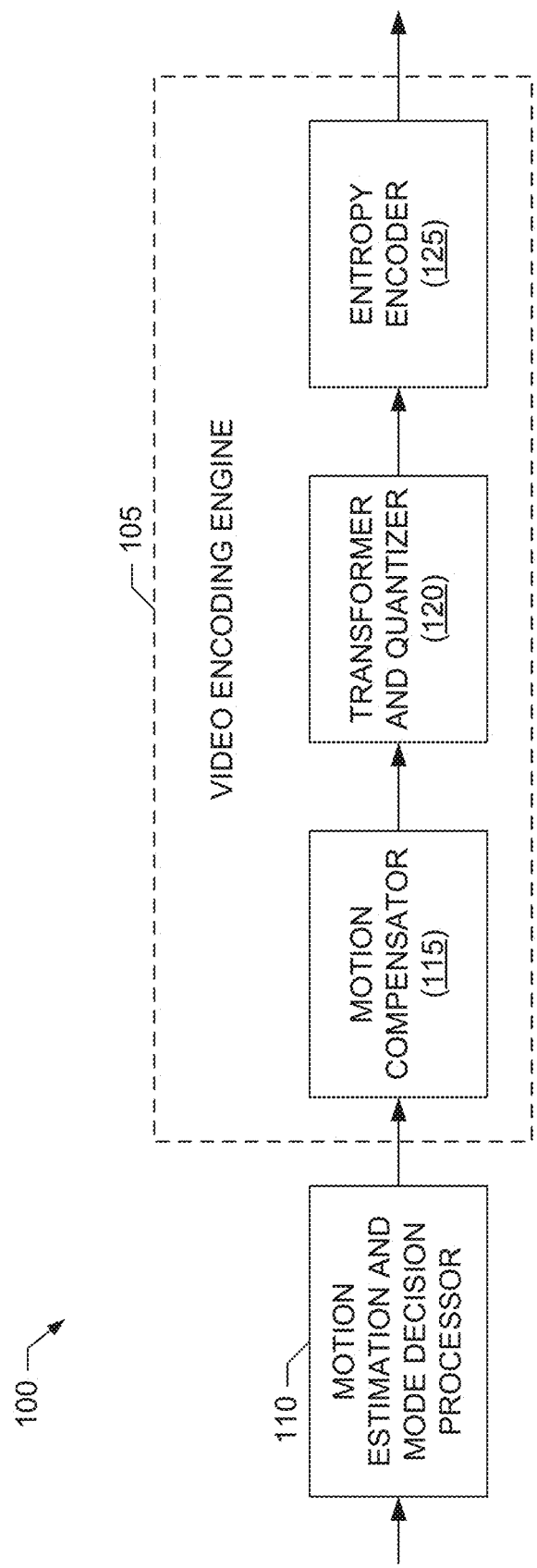
FIG. 1 is a block diagram of an example video encoder employing quantization offset and/or cost factor modification for video encoding as disclosed herein.

The material disclosed herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, wherever possible, the same reference numbers will be used throughout the drawing(s) and accompanying written description to refer to the same or like parts, elements, etc.

DETAILED DESCRIPTION

One or more example implementations are now described with reference to the accompanying figures. While specific configurations and arrangements are discussed, it should be understood that this is done for illustrative purposes. Persons of ordinary skill in the relevant art will recognize that other configurations and arrangements may be employed without departing from the spirit and/or scope of the disclosure. It will be apparent to those skilled in the relevant art that techniques and/or arrangements disclosed herein may also be employed in a variety of systems and applications other than those disclosed herein.

While the following disclosure sets forth various example implementations that may be manifested in architectures, such as system-on-a-chip (SoC) architectures, for example, implementation of the techniques and/or arrangements described herein is not restricted to the described architectures and/or computing systems and may be implemented by any appropriate architecture and/or computing system. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details, such as logic implementations, types and interrelationships of system components, logic partitioning/integration choices, etc., the subject matter disclosed herein may be practiced without such specific details. In other examples, some material, such as, for example, control structures and software instruction sequences, may not be shown in detail in order not to obscure the material disclosed herein.

References in the specification to "one implementation," "an implementation," "an example implementation," etc., indicate that the example implementation described may include a particular feature, structure, characteristic, etc., but other examples may not include that particular feature, structure, characteristic, etc. Moreover, such phrases are not necessarily referring to the same implementation. Further, when a particular feature, structure, characteristic, etc., is described in connection with an example, it is within the knowledge of one of ordinary skill in the art to effect such feature, structure, characteristic, etc., in connection with other implementations whether or not explicitly described herein.

As used herein, the term "coder" refers to an encoder and/or a decoder. Similarly, as used herein, the term "coding" refers to performing video encoding via an encoder and/or performing video decoding via a decoder. For example a video encoder and video decoder are both examples of coders capable of coding video data. In addition, as used herein, the term "codec" refers to any process, program, set of operations, etc., such as, for example, any combination of software, firmware, and/or hardware, that may implement an encoder and/or a decoder. Further, as used herein, the phrase "motion data" refers to any type of data associated with inter-frame encoding, including, but not limited to, one or more motion vectors, reference indices, inter directions, etc.

Methods, apparatus, systems and articles of manufacture (e.g., physical storage structures) to perform quantization offset and/or cost factor modification for video encoding are disclosed herein. Some example methods disclosed herein for video encoding include obtaining a quantization parameter for quantizing a transform coefficient representative of a pixel block in a frame of a video sequence. Some such example methods also include adjusting a quantization offset for quantizing the transform coefficient, the quantization offset being adjusted based on at least the quantization parameter. Some such example methods further include quantizing the transform coefficient according to the quantization parameter and the quantization offset In some disclosed example methods, the quantization parameter corresponds to an index identifying a quantization step size. In some such example methods, adjusting the quantization offset further includes setting the quantization offset to be a first fraction of the quantization step size when the quantization step size is a first value. Some such example methods also include setting the quantization offset to a second fraction, different from the first fraction, of the quantization step size when the quantization step size is a second value.

In some disclosed example methods, adjusting the quantization offset further includes determining a type of encoding used to encode the pixel block. For example, the type of encoding can be at least one of intra-frame encoding or inter-frame encoding. Some such example methods also include adjusting the quantization offset based on at least the quantization parameter and the type of encoding used to encode the pixel block In some disclosed example methods, adjusting the quantization offset further includes determining whether the pixel block is a reference block to be used for encoding other pixel blocks. Some such example methods also include adjusting the quantization offset based on at least the quantization parameter and whether the pixel block is determined to be a reference block. For example, adjusting the quantization offset can include setting the quantization offset based on the quantization parameter, and decreasing the quantization offset when the pixel block is determined to not be a reference block.

In some disclosed example methods, adjusting the quantization offset further includes adjusting the quantization offset based on at least the quantization parameter and resolution of the frame of the video sequence.

In some disclosed example methods, adjusting the quantization offset further includes adjusting the quantization offset based on at least the quantization parameter and a characteristic of the pixel block, the characteristic indicating at least one of an amount of motion or an amount of texture detail associated with the pixel block.

In some disclosed example methods, the quantization offset can be adjusted dynamically on at least one of a frame-by-frame basis or a block-by-block basis.

Some example methods disclosed herein additionally or alternatively include adjusting a cost factor based on at least a characteristic of a pixel block in a frame of a video sequence. Some such example methods can include determining, based on the cost factor, a cost associated with encoding the pixel block according to a first encoding mode. For example, the cost can be a combination (e.g., a linear combination) of a distortion value associated with the first encoding mode and a rate value associated with the first encoding method, with the rate value being scaled by the cost factor.

In some disclosed example methods, the characteristic indicates at least one of an amount of motion or an amount of texture detail associated with the pixel block. For examples in which the characteristic indicates the amount of motion associated with the pixel block, adjusting the cost factor can further include setting the cost factor to a first value when the amount of motion associated with the pixel block exceeds a threshold amount of motion, and setting the cost factor to a second value less than the first value when the amount of motion associated with the pixel block does not exceed the threshold amount of motion. For examples in which the characteristic indicates the amount of texture detail associated with the pixel block, adjusting the cost factor can further include setting the cost factor to a first value when the amount of texture detail associated with the pixel block exceeds a threshold, and setting the cost factor to a second value less than the first value when the amount of texture detail associated with the pixel block does not exceed the threshold.

In some disclosed example methods, adjusting the cost factor further includes determining whether the pixel block is a reference block to be used for encoding other pixel blocks, and adjusting the cost factor based on at least the characteristic of the pixel block and whether the pixel block is determined to be a reference block. In some such examples, adjusting the cost factor further includes setting the cost factor based on the characteristic of the pixel block, and increasing the cost factor when the pixel block is determined to not be a reference block.

In some disclosed example methods, adjusting the cost factor further includes adjusting the cost factor based on at least the characteristic of the pixel block and a quantization parameter for quantizing a transform coefficient representative of the pixel block.

In some disclosed example methods, the cost factor can be adjusted dynamically on at least one of a frame-by-frame basis or a block-by-block basis.

These and other example methods, apparatus, systems and articles of manufacture (e.g., physical storage structures) to implement quantization offset and/or cost factor modification for video encoding are disclosed in greater detail below.

As mentioned above, a video encoder may utilize quantization to reduce the number of bits used to represent the video data. As described in further detail below, video encoders can quantize the video data based on a quantization step size and a quantization offset. In prior video encoders, the quantization offset used for quantization is fixed or, in other words, unchanging. Unlike such prior video encoders, example video encoders disclosed herein may modify the quantization offset based on the quantization step size currently being used to quantize the video data and/or one or more other characteristics of the video data being quantized.

As also mentioned above, a video encoder may utilize a cost function to select one of several possible encoding techniques/modes to be used to encode a block of video data. As described in further detail below, the cost function may evaluate a combination of values determined for a particular encoding technique/mode, with the values being combined according to a cost factor. In prior video encoders, the cost factor used in the cost function is fixed or, in other words, unchanging. Unlike such prior video encoders, example video encoders disclosed herein may modify the cost factor based on one or more characteristics of the block of video data being encoded.

Turning to the figures, a block diagram of at least a portion of an example video encoder 100 implementing quantization offset and/or cost factor modification for video encoding in accordance with teachings disclosed herein is illustrated in FIG. 1. The example video encoder 100 of FIG. 1 implements multiple different types/modes of video encoding according to one or more video coding standards, such as H.264 video coding, high efficiency video coding (HEVC), VP8 video coding, VP9 video coding, etc. For example, one type of video encoding implemented by the video encoder 100 can be intra-frame encoding, which encodes a given pixel block of a given video frame by using pixels from one or more neighboring blocks of the same frame as predictors for predicting the given pixel block, and then encoding the residue, or difference, between the predicted pixel block and the given pixel block. Another type of video encoding implemented by the video encoder 100 can be inter-frame encoding, which encodes a given pixel block of a given video frame by using pixels of one or more different (e.g., prior or future) frames as a reference for predicting the given pixel block, and then encoding the residue, or difference, between the predicted pixel block and the given pixel block. The different encoding types implemented by the video encoder 100 may each have different modes corresponding to different configurations of the encoding type. For example, the different modes of the intra-frame encoding and/or inter-frame encoding may correspond to (1) different partitioning of the video frames into different arrangements of pixel blocks (e.g., macroblocks), (2) different direction(s) from which one or more reference pixel blocks can be chosen relative to a given pixel block being encoded, etc.

Figure 4:
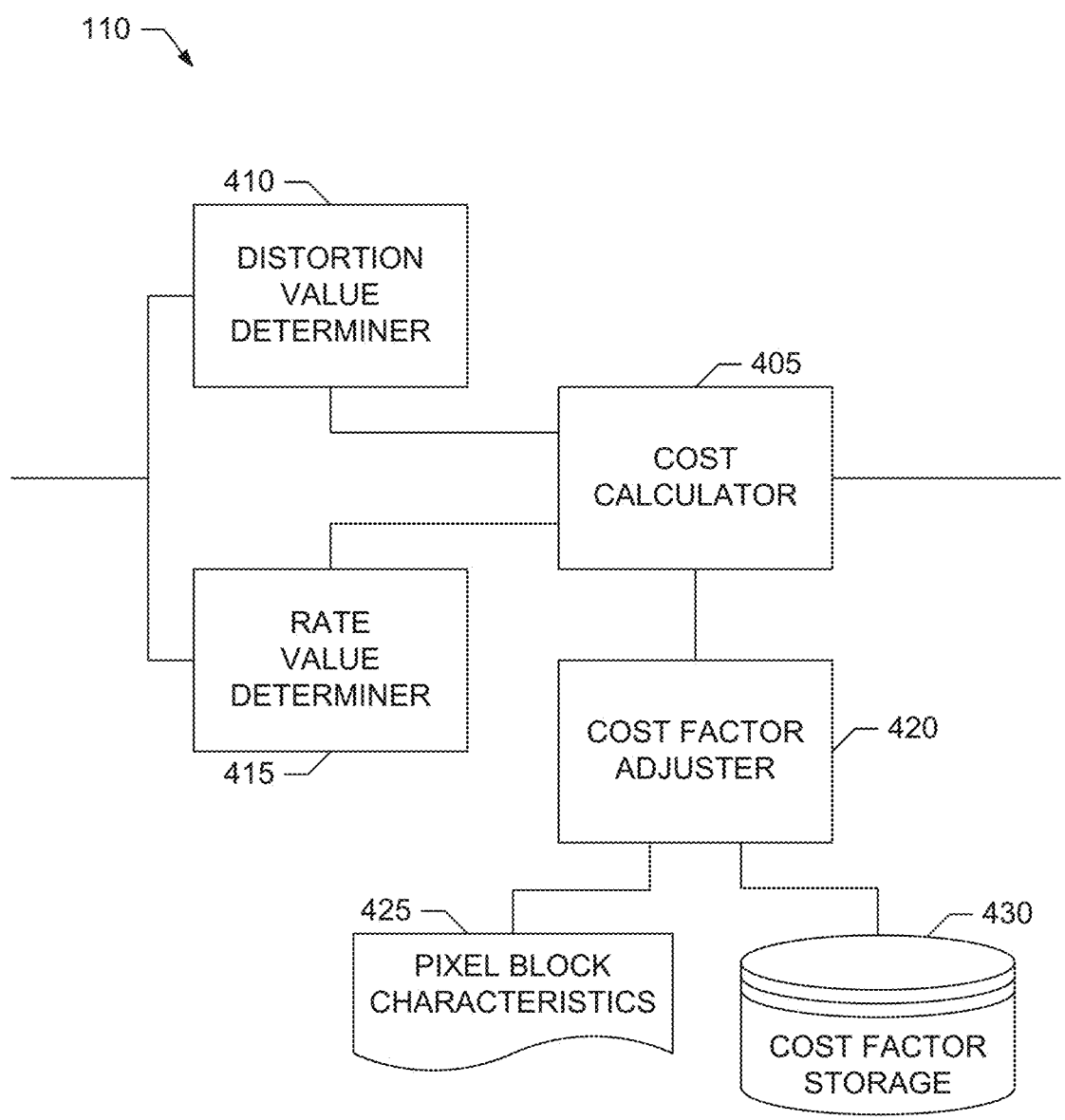
FIG. 4 is a block diagram illustrating an example implementation of at least a portion of an example motion estimation and mode decision processor that can be used to implement cost factor modification in the example video encoder of FIG. 1.

In the illustrated example of FIG. 1, the video encoder 100 includes an example video encoding engine 105 preceded by an example motion estimation and mode decision processor 110. Among other things, the motion estimation and mode decision processor 110 performs a mode decision process to select which one of the different possible combinations of video encoding types and modes (also referred to herein collectively as types/modes or just modes) is to be used to encode a given pixel block in a given video frame. In some examples, the encoding type/mode selected by the motion estimation and mode decision processor 110 can vary among successive encoded pixel blocks (i.e., on a block-by-block basis) or among successive encoded video frames (i.e., on a frame-by-frame basis). To select one of the different possible combinations of video encoding types/modes to encode a particular pixel block, the motion estimation and mode decision processor 110 of the illustrated example implements a cost function having a cost factor. The cost function can be evaluated to determine respective costs for the different possible combinations of video encoding types/modes. For example, the motion estimation and mode decision processor 110 can select the video encoding type/mode having the best (e.g., lowest) cost for encoding a given pixel block. Unlike in prior video encoders in which the cost factor is fixed or, in other words, kept constant, the motion estimation and mode decision processor 110 can adjust the cost factor used in the cost function based on one or more characteristics of the pixel block being encoded. For example, and as described in further detail below, the example motion estimation and mode decision processor 110 can evaluate the characteristic(s) of a given pixel block (and/or given video frame) and then adjust the cost factor to bias video encoding mode selection in favor of reducing distortion, and/or reducing data rate, etc. An example implementation of the motion estimation and mode decision processor 110 is illustrated in FIG. 4, which is described in further detail below. In some examples, the motion estimation and mode decision processor 110 is omitted from the example video encoder 100.

The example video encoding engine 105 of FIG. 1 includes an example motion compensator 115, an example transformer and quantizer 120 and an example entropy encoder 125. As noted above, in intra-frame and inter-frame encoding, the residue, or difference, between an original pixel block and a predicted pixel block determined from a reference block is encoded to represent the original pixel block. The encoded residue is then transmitted to a video decoder, which estimates the original pixel block by combining the residue with a version of the predicted pixel block formed by the decoder using the reference pixel block. The motion compensator 115 of the illustrated example implements any appropriate motion compensation technique to further reduce the amount of video information in the residue, thereby reducing the amount of information needing to be encoded for a given pixel block. In general, motion compensation attempts to define a transformation (e.g., such as a directional shift indicative of motion) that can account for at least some of the difference between original pixel block and a predicted pixel block, thereby reducing the amount of information needed to represent the residue. In some examples, the motion compensator 115 is omitted from the example video encoder 100.

Figure 2:
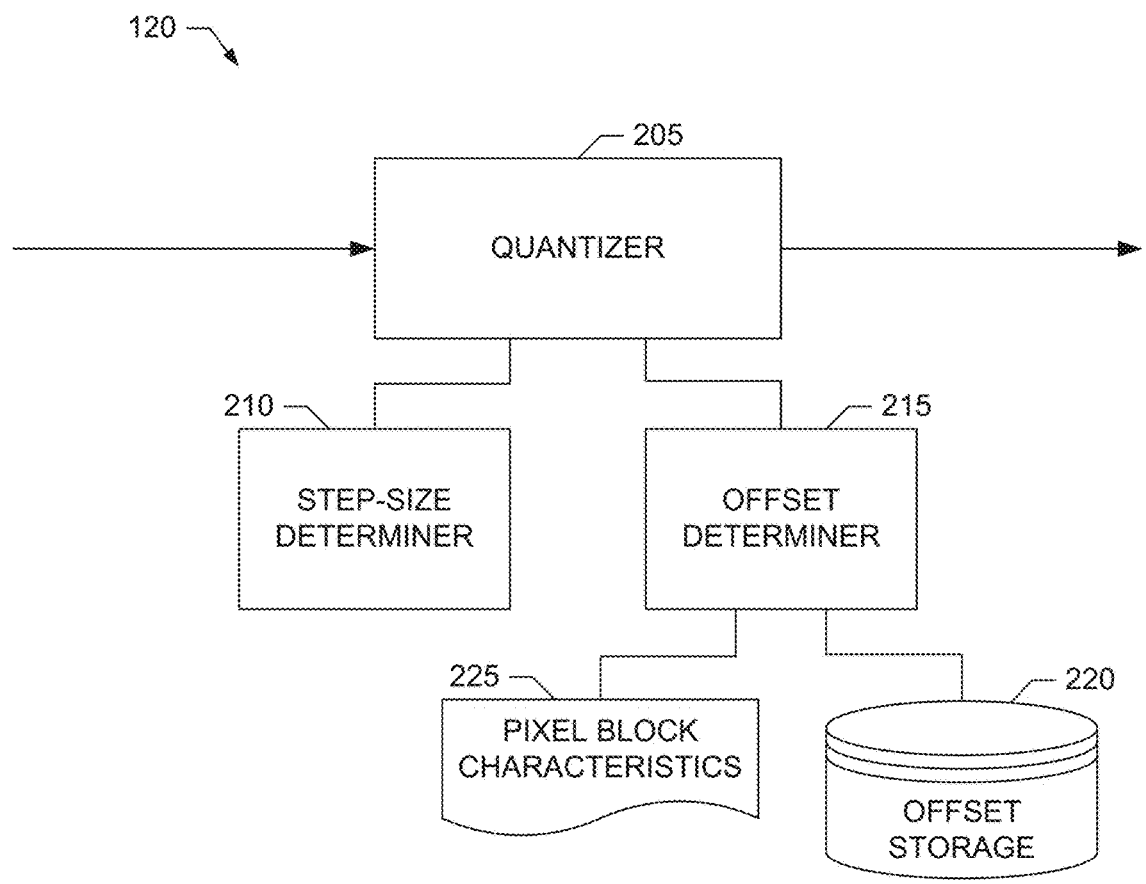
FIG. 2 is a block diagram illustrating an example implementation of at least a portion of an example transformer and quantizer that can be used to implement quantization offset modification in the example video encoder of FIG. 1.

The example transformer and quantizer 120 of FIG. 1 processes the residue data with any appropriate transform, such as a discrete cosine transform (DCT), wavelet transform, etc., to further reduce the amount of information to be encoded for a given pixel block. The result is a set of transform coefficients representing the residue to be encoded. The transformer and quantizer 120 of the illustrated example then quantizes transform coefficients to further reduce the amount of information to be encoded. For example, the transformer and quantizer 120 can map the range of possible levels of the transform coefficients to a (usually smaller) set of discrete levels (e.g., amplitude levels). As described above and in further detail below, the transformer and quantizer 120 of the illustrated example employs a quantization step size and a quantization offset to segment the range of possible input levels into a set of discrete levels. Unlike in prior video encoders in which the quantization offset is fixed or, in other words, kept constant, the transformer and quantizer 120 of the illustrated example can adjust the quantization offset based on the quantization step size being used for a given pixel block (and/or given video frame) and/or based on one or more other characteristics of the pixel block (and/or video frame) being encoded. For example, and as described in further detail below, the example transformer and quantizer 120 of FIG. 1 can use the current quantization step and/or one or more other pixel block characteristics as an index or indices for selecting one of several possible quantization offsets for use in quantizing a given pixel block (or video frame). An example implementation of the transformer and quantizer 120 is illustrated in FIG. 2, which is described in further detail below. In some examples, the transformer and quantizer 120 is omitted from the example video encoder 100.

The example entropy encoder 125 of FIG. 1 implements any appropriate entropy encoding technique to encode the quantized transform coefficients determined by the transformer and quantizer 120 into respective sequences of bits. For example, the entropy encoder 125 can assign sequences of fewer bits to represent transform coefficient values having a higher likelihood of occurrence, and assign sequences of more bits to represent transform coefficient values having a lower likelihood of occurrence. This can, on average, reduce the number of bits required to encode the video data to be output from the video encoder 100. In some examples, the entropy encoder 125 is omitted from the example video encoder 100.

Although FIG. 1 illustrates an example implementation of the video encoder 100, one or more of the blocks illustrated in FIG. 1 can be omitted without departing from the scope of this disclosure. Additionally or alternatively, in some examples, the example video encoder 100 implements functionality in addition to quantization offset and/or cost factor modification for video encoding as disclosed herein.

A block diagram of an example implementation of the transformer and quantizer 120 of FIG. 1 is illustrated in FIG. 2. The block diagram of FIG. 2 illustrates structures associated with implementing quantization offset modification for video encoding in the transformer and quantizer 120. Other structures implemented by the transformer and quantizer 120, which are not material to the examples disclosed herein, have been omitted for clarity.

Turning to FIG. 2, the example transformer and quantizer 120 illustrated therein includes an example quantizer 205 to quantize the video data (e.g., the transform coefficients mentioned above) to be encoded. As described above and in further detail below, the example quantizer 205 of FIG. 2 maps a range of input values (e.g., which may continuous, or of high precision, etc.) to a (usually) smaller set of discrete values in order to reduce the number of bits used to transmit encoded video. In the example of FIG. 2, an example step-size determiner 210 included in the transformer and quantizer 120 chooses a quantization step size, q, for use by the quantizer 205 from a set of stored, pre-defined or otherwise determined values. The quantization step size, q, defines the size of a sub-range of input values that will be mapped to a single discrete value, and its index, denoted as the quantization parameter (QP), is embedded in the encoded video bit stream.

The quantizer 205 of the illustrated example also employs a quantization offset, s, (which is also referred to as a rounding offset), in addition to the quantization step size, q, to quantize the input video data. In some examples, such as, but not limited to, an implementation directed to H.264 encoding, the quantizer 205 quantizes an input transform coefficient W representative of the video data being encoded according to Equation 1, which is:

$$Z = \lfloor (|W|+s)/q \rfloor \times \text{sign}(W). \quad \text{Equation 1}$$

In Equation 1, Z is the quantized level of the transform coefficient, W, which is then encoded by, for example, the entropy encoder 125 into the encoded video bit stream.

On the video decoder side of this example, a video decoder reconstructs an estimate of the encoded video data from the quantized video data using an inverse quantization process. For example, a video decoder can reconstruct the transform coefficient, W, from the quantized level, Z, of Equation 1 to yield a reconstructed transform coefficient, W', using Equation 2, which is:

$$W' = q \times Z. \quad \text{Equation 2}$$

According to Equation 2, the video decoder may not use the quantization offset, s, when reconstructing the video data from the quantized values. Comparing Equation 1 and Equation 2, it can be seen that quantization is a potentially lossy process, which may yield a quantization error corresponding to the difference between the original video data (e.g., the transform coefficients, W, prior to quantization) and the reconstructed video data (e.g., the reconstructed transform coefficients, W', after quantization). The quantization error, E, associated with the quantization process can be represented mathematically by Equation 3, which is:

$$E = W - W'. \quad \text{Equation 3}$$

The quantization error, E, correlates to a quality loss due to the quantization process performed by the quantizer Based on the foregoing discussion, the quantization offset, s, (in addition to the quantization step size q) is a factor that can control the values of the quantized video data (e.g., the quantized transform values, Z,) and, as such, can affect the quantization error, E. For example, the quantization offset, s, controls a size of a deadzone. The deadzone represents a range of input values that will be mapped to a value of zero via quantization. A smaller quantization offset provides a larger deadzone. Because a larger deadzone maps more input values to zero, a larger deadzone can lead to a lower bit rate at encoding, but can also lead to more perceivable errors. Therefore, being able to control the size of the deadzone may be important for controlling perceived video quality.

Figure 3:
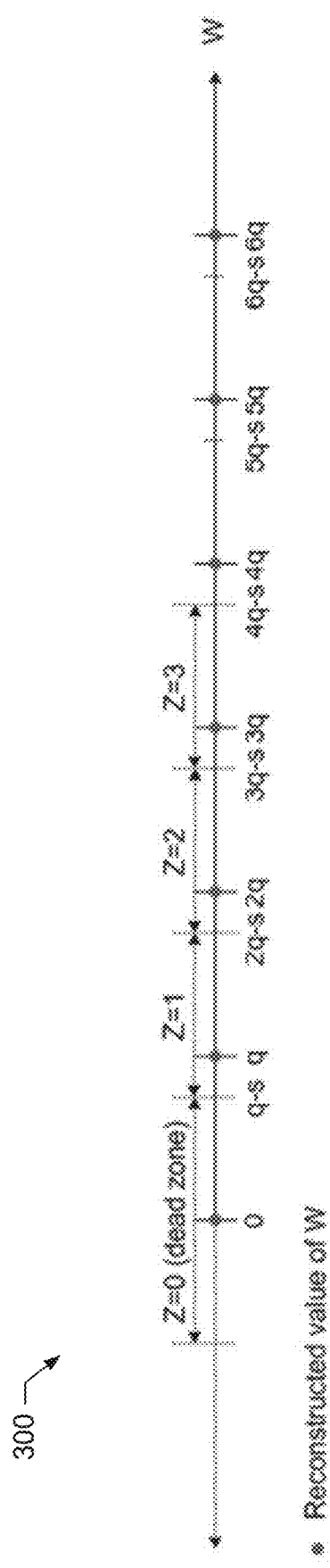
FIG. 3 illustrates an example quantization operation performed by the example transformer and quantizer of FIG. 2.

FIG. 3 illustrates an example graph 300 demonstrating the effect of the quantization offset, s, and the quantization step size, q, on the quantization process performed by the example quantizer 205. As illustrated in the example graph 300 of FIG. 3, when the value |W| of the input transform coefficient W is in the range of 0 and (q−s), the quantizer 205 of the illustrated example will quantize the value of the transform coefficient W to zero according to Equation 1. The input range [−(q−s), (q−s)] corresponds to the quantizer deadzone described above. Different quantization step sizes, q, and different quantization offsets, s, can yield different deadzone sizes. For example, with the same sequence of transform coefficients, W, being input to the quantizer 205, an increase in the quantization step size, q, will increase the deadzone, potentially causing more coefficients to be quantized to zero. As another example, for a constant quantization step size, q, decreasing the quantization offset, s, will increase the deadzone, potentially causing more coefficients to be quantized to zero. Thus, a smaller quantization offset, s, may decrease the bit rate of the encoded video bit stream (e.g., because more video data may be quantized to the value of zero), whereas a larger quantization offset, s, may increase the bit rate of the encoded video bit stream (e.g., because less video data may be quantized to the value of zero).

Prior video encoders apply the same quantization offset, s, for any quantization step size, q, (or QP index representing the quantization step size, q), as well as for any pixel block type. Unlike such prior video encoders, the example transformer and quantizer 120 of FIG. 2 includes an example offset determiner 215 to adaptively modify (e.g., select, adjust, etc.) the quantization offset, s, for use by the quantizer 205. In the illustrated example, the offset determiner 215 dynamically adjusts the quantization offset, s, to be used to quantize a particular pixel block (e.g., corresponding to modification on a block-by-block basis) or used to quantize the pixel blocks in a particular video frame (e.g., corresponding to modification on a frame-by-frame basis) based on the quantization step size, q, (or the QP indexing the step size, q) determined by the step-size determiner 210 for quantizing the pixel block (e.g., the transform coefficients of the pixel block) and/or other characteristics 225 of the pixel block. For example, the offset determiner 215 may dynamically select the quantization offset, s, from an example offset storage 220 based on the quantization step size, q, (or the QP indexing the step size, q) determined by the step-size determiner 210, and then further adjust the selected quantization offset, s, based on one or more of the pixel block characteristics 225. Additionally or alternatively, in some examples, the offset determiner 215 dynamically determines the quantization offset, s, from the quantization step size, q, (or the QP indexing the step size, q) and/or the pixel block characteristics 225 using a mathematical formula, a predefined mapping, etc., and/or any other appropriate technique. The example offset storage 220 can be implemented by any number and/or type(s) of memories, storage devices, etc., such as, but not limited to, the memory 1412 and/or the storage 1414 of the example system 1400, which is described in further detail below.

For example, the offset determiner 215 may obtain the QP index identifying the quantization step size, q, being used by the quantizer 205 to quantize a given pixel block, and then use a look-up table or other mapping formula/function to obtain, from the offset storage 220, and/or via calculation, a particular quantization offset, s, specified as a fraction of the current quantization step size, q. As such, the offset determiner 215 may set the quantization offset, s, to be a first fraction of the quantization step size when the quantization step size is a first value, and may set the quantization offset, s, to be a second fraction, different from the first fraction, of the quantization step size when the quantization step size is a second value.

Example pixel block characteristics 225 that may be used (e.g., evaluated) by the offset determiner 215 to determine a quantization offset, s, for use by the quantizer 205 to quantize a pixel block (or set of pixel blocks) include, but are not limited to, (1) the type of encoding (e.g., intra-frame encoding, inter-frame encoding, etc.) being used to encode the pixel block, (2) whether the pixel block is a reference block to be used for encoding other pixel blocks (or the frame containing the pixel block is a reference frame to be used for encoding other video frames), (3) the video resolution of the frame containing the pixel block, (4) an amount of motion (e.g., a motion vector magnitude) associated with the pixel block, (5) an amount of texture detail associated with the pixel block, etc. For example, the offset determiner 215 may determine a type of encoding (e.g., intra-frame encoding, inter-frame encoding, etc.) being used to encode a given pixel block, and adjust the quantization offset, s, based on at least the quantization step size, q, (or the QP identifying the step size) and the type of encoding being used to encode the pixel block. Additionally or alternatively, the offset determiner 215 may determine whether the given pixel block is a reference block to be used for encoding other pixel blocks, and adjust the quantization offset, s, based on at least the quantization step size, q, (or the QP identifying the step size) and whether the pixel block is determined to be a reference block. For example, the offset determiner 215 could be configured to set (e.g., select) the quantization offset, s, based on the quantization step size, q, (or the QP identifying the step size) and then decrease the quantization offset, s, in response to determining the pixel block is not a reference block. Additionally or alternatively, the offset determiner 215 may adjust the quantization offset, s, based on at least the quantization step size, q, (or the QP identifying the step size) and a video resolution of the video frame containing the given pixel block. Additionally or alternatively, the offset determiner 215 may adjust the quantization offset, s, based on at least the quantization step size, q, (or the QP identifying the step size) and one or more of the amount of motion or the amount of texture detail associated with the given pixel block.

A block diagram of an example implementation of the motion estimation and mode decision processor 110 of FIG. 1 is illustrated in FIG. 4. The block diagram of FIG. 4 illustrates structures associated with implementing cost factor modification for video encoding in the motion estimation and mode decision processor 110. Other structures implemented by the motion estimation and mode decision processor 110 have been omitted for clarity.

Turning to FIG. 4, the motion estimation and mode decision processor 110 illustrated therein includes an example cost calculator 405 to determine respective costs for the different possible combinations of video encoding types/modes supported by the video encoder 100. In the illustrated example of FIG. 4, the cost calculator 405 determines a rate-distortion cost for a given video encoding type/mode implemented by the video encoder 100. For a given video encoding type/mode, the rate-distortion cost determined by the cost calculator 405 combines a distortion value determined for the encoding type/mode with a rate value associated with the encoding type/mode into a single cost for the encoding type/mode. In this way, the combined rate-distortion costs determined by the cost calculator 405 for the different encoding types/modes supported by the video encoder 100 can be evaluated to select one of the encoding type/modes for encoding a pixel block or frame that achieves a desired balance between distortion and encoder bit rate.

An example rate distortion cost that can be calculate by the cost calculator 405 is given by Equation 4, which is:

$$\text{Cost(Mode,QP)} = \text{Distortion(Mode,QP)} + \lambda \times \text{Rate(Mode,QP)}. \quad \text{Equation 4}$$

In Equation 4, Cost(Mode,QP) is the encoding cost, or cost, associated with a particular encoding type/mode, identified as Mode, and a particular quantization parameter, QP. As noted above, the quantization parameter QP identifies, for example, the quantization step size used for quantizing video data (e.g., transform coefficients) to be encoded by the video encoder 100. The example motion estimation and mode decision processor 110 of FIG. 4 evaluates the costs, Cost(Mode,QP), determined by the cost calculator 405 for the different encoding types/modes supported by the video encoder 100 and selects the encoding type/mode having the best (e.g., lowest) cost, Cost(Mode,QP), for encoding a current pixel block (e.g., for block-by-block encoding type/mode selection) or current frame of pixel blocks (e.g., for frame-by-frame encoding type/mode selection).

In Equation 4, Distortion(Mode,QP) is the distortion associated with the particular encoding type/mode, Mode, and the particular quantization parameter, QP. In the illustrated example of FIG. 4, the motion estimation and mode decision processor 110 includes an example distortion value determiner 410 to determine the distortion value, Distortion(Mode,QP), for a particular encoding type/mode, Mode, and a particular quantization parameter, QP. In some examples, the distortion value, Distortion(Mode,QP), is a measurement of the pixel difference between an original pixel block and a reconstructed pixel block for a given encoding type/mode, Mode, and quantization parameter, QP. As such, the distortion value determiner 410 may implement a corresponding video decoder for one or more, or all, of the different encoding types/modes supported by the video encoder 100 to enable the distortion value determiner 410 to determine the resulting reconstructed pixel block for an original pixel block encoded according to a particular one of the different encoding types/modes supported by the video encoder 100. Any appropriated metric(s) for quantifying distortion can be used by the distortion value determiner 410 to determine a distortion value representative of the distortion associated with a given encoding type/mode, Mode, and quantization parameter, QP.

In Equation 4, Rate(Mode,QP) is the rate value associated with the particular encoding type/mode, Mode, and the particular quantization parameter, QP. In the illustrated example of FIG. 4, the motion estimation and mode decision processor 110 includes an example rate value determiner 415 to determine the rate value, Rate(Mode,QP), for a particular encoding type/mode, Mode, and a particular quantization parameter, QP. In some examples, the rate value, Rate (Mode,QP), corresponds to the number of bits that will be used by the video encoder 100 when encoding an original pixel block using a given encoding type/mode, Mode, and quantization parameter, QP. Any appropriated metric(s) for quantifying (e.g., determining or estimating) bit rate can be used by the rate value determiner 415 to determine a rate value representative of the bit rate associated with a given encoding type/mode, Mode, and quantization parameter, QP.

In Equation 4, the parameter $\lambda$ is a cost factor that controls the relative emphasis or contribution that the distortion value, Distortion(Mode,QP), and the rate value, Rate(Mode,QP), have to the cost, Cost(Mode,QP), for a given encoding type/mode, Mode, and quantization parameter, QP. For example, by setting the cost factor, $\lambda$, to a higher value, the emphasis (or weight) of the bit rate value (Rate (Mode,QP)) in the encoding cost (Cost(Mode,QP)) will increase relative to the distortion value (Distortion(Mode,QP)). Conversely, by setting the cost factor, $\lambda$, to a lower value, the emphasis (or weight) of the bit rate value (Rate (Mode,QP)) in the encoding cost (Cost(Mode,QP)) will decrease relative to the distortion value (Distortion(Mode,QP)).

In prior video encoders, the cost factor, $\lambda$, used to evaluate the rate distortion cost (e.g., Cost(Mode,QP) of Equation 4) is fixed to a single, unchanging value determined by the quantization parameter, QP. Thus, prior video encoders use the same cost factor, $\lambda$, for determining the rate distortion cost, Cost(Mode,QP), for any encoding type/mode, Mode, supported by the encoder, as well as for pixel blocks/image frames exhibiting different characteristics. Unlike such prior video encoders, the example motion estimation and mode decision processor 110 of FIG. 4 includes an example cost factor adjuster 420 to adjust the cost factor, $\lambda$, to adaptively modify (e.g., select, adjust, etc.) the cost factor, $\lambda$, for use by the cost calculator 405. In the illustrated example, the cost factor adjuster 420 dynamically adjusts the cost factor, $\lambda$, to be used by the cost calculator 405 to calculate the rate distortion cost, Cost(Mode,QP), for a particular pixel block (e.g., corresponding to modification on a block-by-block basis) or for the pixel blocks in a particular video frame (e.g., corresponding to modification on a frame-by-frame basis) based on one or more characteristics 425 of the particular pixel block. For example, the cost factor adjuster 420 may dynamically select the cost factor, $\lambda$, from an example cost factor storage 430 based on one or more of the pixel block characteristics 425. Additionally or alternatively, in some examples, the cost factor adjuster 420 can dynamically determine, or adjust, the cost factor, $\lambda$, based on inputting the one or more of the pixel block characteristics 425 into a mathematical formula, a predefined mapping, etc., and/or any other appropriate technique. The example cost factor storage 430 can be implemented by any number and/or type(s) of memories, storage devices, etc., such as, but not limited to, the memory 1412 and/or the storage 1414 of the example system 1400, which is described in further detail below.

Example pixel block characteristics 425 that may be used (e.g., evaluated) by the cost factor adjuster 420 to determine, or adjust, the cost factor, $\lambda$, for use by the cost calculator 405 to determine the encoding cost for a pixel block (or set of pixel blocks) include, but are not limited to, (1) whether the pixel block is a reference block to be used for encoding other pixel blocks (or the frame containing the pixel block is a reference frame to be used for encoding other video frames), (2) the video resolution of the frame containing the pixel block, (3) an amount of motion (e.g., a motion vector magnitude) associated with the pixel block, (4) an amount of texture detail associated with the pixel block, etc. For example, the cost factor adjuster 420 may determine whether the given pixel block is a reference block to be used for encoding other pixel blocks, and then set or adjust the cost factor, $\lambda$, based on whether the pixel block is determined to be a reference block. For example, the cost factor adjuster 420 could be configured to increase the cost factor, $\lambda$, relative to a current setting in response to determining the pixel block is not a reference block. Additionally or alternatively, the cost factor adjuster 420 may set or adjust the cost factor, $\lambda$, based on a video resolution of the video frame containing the given pixel block. Additionally or alternatively, the cost factor adjuster 420 may set or adjust the cost factor, $\lambda$, based on the amount of motion and/or the amount of texture detail associated with the given pixel block. For example, the cost factor adjuster 420 could be configured to set the cost factor, λ, to a first value when the amount of motion associated with the pixel block exceeds a threshold amount of motion, and to set the cost factor, λ, to a second value less than the first value when the amount of motion associated with the pixel block does not exceed the threshold amount of motion. Additionally or alternatively, in some examples, the cost factor adjuster 420 could be configured to set the cost factor, λ, set the cost factor to a third value when the amount of texture detail associated with the pixel block exceeds a threshold amount of detail, and to set the cost factor to a fourth value less than the third value when the amount of texture detail associated with the pixel block does not exceed the threshold amount of detail.

Other pixel block characteristics 425 that may be used (e.g., evaluated) by the cost factor adjuster 420 to determine, or adjust, the cost factor, λ, include the type of encoding (e.g., intra-frame encoding, inter-frame encoding, etc.) that is considered by the cost calculator 405 as an option for encoding the current pixel block. For example, the cost factor adjuster 420 may obtain the QP index identifying the quantization step size, q, being evaluated by the cost calculator 405 for encoding a given pixel block and then use a look-up table or other mapping formula/function to obtain, from the cost factor storage 430, and/or via calculation, a particular cost factor, λ, based on the quantization step size, q, (or the QP identifying the step size) and/or the type/mode of encoding being evaluated for encoding the pixel block, and/or one or more other characteristics 425 of the pixel block to be encoded.

At a high level, the cost factor, λ, in Equation 4 indicates how much pixel distortion each encoded bit is worth. The cost factor adjuster 420 of the illustrated example can adjust the cost factor, λ, to bias the trade-off between distortion and bit rate when deciding which encoding type/mode is to be used to encode a pixel block. Generally, a higher cost factor, λ, may cause the motion estimation and mode decision processor 110 of the video encoder 100 to choose the encoding type/mode that yields the lowest bit rate for a given pixel block or set of pixel blocks in a given video frame. Conversely, a lower cost factor, λ, may cause the motion estimation and mode decision processor 110 of the video encoder 100 to choose the encoding type/mode that yields the lowest distortion for a given pixel block or set of pixel blocks in a given video frame. For example, for pixel blocks that exhibit high motion and high level of texture details, but which are not reference blocks, the cost factor adjuster 420 may increase the cost factor, λ, to bias the encoding type/mode decision towards modes that generate fewer numbers of bits (but with potentially more distortion), thereby enabling the saved bits to be allocated to other pixel blocks. For pixel blocks that exhibit low motion and low level of texture details, and which are reference blocks, the cost factor adjuster 420 may decrease the cost factor, λ, to bias the encoding type./mode decision towards modes that generate larger number of bits (and with potentially less distortion).

In some examples, quantization offset modification (e.g., as performed by the offset determiner 215) and cost factor modification (e.g., as performed by the cost factor adjuster 420) are combined in the video encoder 100. In some examples, for each pixel block (e.g., macroblock, pixel region, etc.) containing N×M pixels, where N and M are integers, or for each frame, the quantization offset modification as performed by the offset determiner 215 and the cost factor modification as performed by the cost factor adjuster 420 are combined to alter either or both of the quantization deadzone and/or the rate distortion cost computation based on one or more characteristics of the video data (e.g., pixel block or frame) being encoded. For example, when there are higher motion and/or higher details (textures) in the pixel block (or frame) to be encoded, and/or there is less chance of the pixel block (or frame) being used as reference for other blocks (or frames), the offset determiner 215 of the illustrated example may decrease the quantization offset, s, to increase the quantization deadzone, and the cost factor adjuster 420 may additionally or alternatively increase the cost factor, λ, to bias the cost function of Equation 4 towards favoring encoding types/modes yielding lower bit rates (potentially at the expense of yielding higher distortion). Conversely, when there are lower motion and/or lower details (textures) in the pixel block (or frame) to be encoded, and/or there is a greater chance of the pixel block (or frame) being used as reference for other blocks (or frames), the offset determiner 215 of the illustrated example may increase the quantization offset, s, to decrease the quantization deadzone, and the cost factor adjuster 420 may additionally or alternatively decrease the cost factor, λ, to bias the cost function of Equation 4 towards favoring encoding types/modes yielding lower distortion (potentially at the expense of yielding higher bit rates).

In some examples, the offset determiner 215 and/or the cost factor adjuster 420 determine an amount of motion associated with a pixel block from motion data (e.g., such as motion vectors) determined by the video encoder 100 for the pixel block or the video frame containing the pixel block. For example, pixel blocks associated with larger motion vectors may be determined to exhibit more motion than pixel blocks associated with smaller motion vectors. Additionally or alternatively, in some examples, the offset determiner 215 and/or the cost factor adjuster 420 determine an amount of texture detail associated with a pixel block by determining a variance among the pixels in the pixel block, and/or some other metric capable of quantifying the similarity (or difference) between pixels in a pixel block. For example, pixel blocks associated with larger pixel variances may be determined to exhibit more texture detail than pixel blocks associated with smaller pixel variances.

Note that the cost factor, λ, does not change the size of the quantization deadzone. Instead, the cost factor, λ, balances the weight between distortion and bit rate used in the cost calculation performed in the mode decision stage of the video encoder 100. Using a larger cost factor, λ, biases the video encoder 100 to choose the encoding type/mode with lower bit rate. Using a smaller cost factor, λ, biases the video encoder 100 to choose the encoding type/mode with lower distortion.

As a further example, quantization offset modification as performed by the offset determiner 215 and the cost factor modification as performed by the cost factor adjuster 420 can be combined to vary the quantization offset, s, from largest offset to smallest offset, and to vary the cost factor, λ, from smallest cost factor value to largest value, as follows for the following combination of pixel block characteristics:

1. Reference pixel block/frame with low motion and high texture: configure a largest quantization offset and smallest cost factor.

2. Reference pixel block/frame with high motion and low texture: decrease the quantization offset and increase the cost factor.

3. Non-reference pixel block/frame with high motion and low texture: further decrease the quantization offset and further increase the cost factor.

4. Non-reference pixel block/frame with high motion and high texture: configure the smallest quantization offset and largest cost factor.

In some video coding standards, such as H.264 video coding, intra-coded frames (also referred to as I-frames) and predicted frames (also referred to as P frames) may be used as reference frames Accordingly, for I and P frames, or pixel blocks contained in such frames, the offset determiner 215 may select or adjust the quantization offset to be a relatively large value to yield a relatively small deadzone, and the cost factor adjuster 420 may select or adjust the cost factor to be a relatively small value to bias mode selection to select an encoding type/mode yielding relatively low distortion. Conversely, bidirectional predicted frames (also referred to as B-frames) are typically not used as reference frames. Accordingly, for B frames, or pixel blocks contained in such frames, the offset determiner 215 may select or adjust the quantization offset to be a relatively smaller value to yield a relatively larger deadzone (e.g., to reduce bit rate), and the cost factor adjuster 420 may select or adjust the cost factor to be a relatively larger value to bias mode selection to select an encoding type/mode yielding relatively low bit rate (e.g., to further reduce the overall bit rate associated with pixel blocks in B-frames).

In some video coding standards, not all pixel blocks (e.g., macroblocks or pixel regions) in the reference frame will be used as references for other pixel blocks (e.g., other macroblocks or pixel regions). Accordingly, the video encoder 100 may employ two-pass encoding in which a first pass involves determining if a pixel block is used as a reference block, and a second pass involves encoding the pixel block using quantization offset modification and cost factor modification as disclosed herein.

As noted above, for different quantization step size values (or corresponding QP values), the video encoder 100 can select different quantization offsets and/or different cost factor values to provide a desired rate-distortion tradeoff and/or to improve coding efficiency. Additionally, because the quality of the pixel blocks used as reference blocks may have more impact on performance than the quality of non-reference pixel blocks, by adjusting the quantization offset as disclosed herein, the video encoder 100 can choose to boost the quality of the reference pixel blocks while potentially sacrificing the quality of non-reference pixel blocks to yield a desired overall quality of an encode video sequence at an acceptable bit rate. Furthermore, viewers of pixel blocks with higher levels of motion and texture details may not notice an increase in encoding distortion. As such, the video encoder 100 can increase the cost factor and decrease the quantization offset for such blocks to save bits that can be used for other pixel blocks (e.g., reference blocks) having a greater impact on overall visual quality.

In some examples, the quantization offset, s, and/or the cost factor, $\lambda$, can be configured on a frame-by-frame basis or a block-by-block basis via a software driver call to a video encoding engine implemented in hardware. For example, a software kernel running on a graphics processing unit (GPU) could be adapted to configure the values for the quantization offset, s, and/or the cost factor, $\lambda$, for each pixel block (e.g., macroblock or pixel region) in a frame, thereby providing finer grain adjustment than on a frame-by-frame basis. Also, in some examples, the quantization offset, s, may be specified (e.g., by the software kernel running on the GPU) as a fraction of the quantization step size, q, being used by the quantizer 205. For example, the quantization offset, s, could be specified to be a multiple of $1/16^{th}$ the value of the quantization step size, q, such as a value in the range [q/16, 2q/16, 3q/16, 4q/16, 5q/16, 6q/16, 7q/16, 8q/16]. Additionally or alternatively, the quantization offset, s, could be specified as some other fraction, percentage, etc., of the current quantization step size, q.

Example performance results for the example video encoder 100 of FIG. 1, as well as example quantization offsets that can be configured by the offset determiner 215 for use by the video encoder 100, are illustrated in FIGS. 5-10. Graphs 500, 700 and 900, and tables 600, 800 and 1000, of FIGS. 5-10 provide example performance results in terms of Bjøntegaard delta peak signal-to-noise ratio (BD-PSNR) achieved by the video encoder 100 through selecting different quantization offsets, s, (specified as a fraction of the quantization step size, q) when encoding video data with different resolutions. The video resolutions examined in the example performance results of FIGS. 5-10 include common intermediate format (CIF), quarter CIF (QCIF), standard definition (SD), 720 pixels of vertical resolution (720 p) and 1080 pixels of vertical resolution (1080 p).

Figures 5, 6:
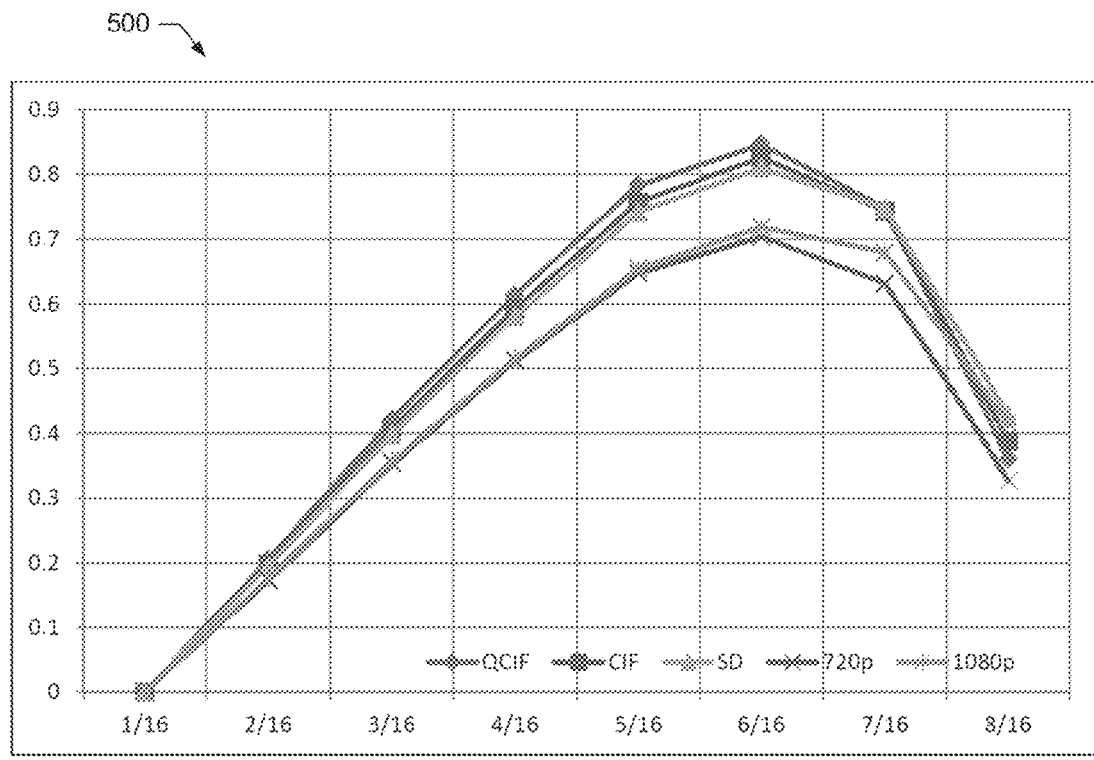

The example graph 500 of FIG. 5 depicts BD-PSNR for intra-frame encoding of pixel blocks over different video resolutions (QCIF, CF, SD, 720 p and 1080 p) and for QP values in the range of [22, 27, 32, 37]. (In H.264 coding, QP can range from 0 to 51). In the graph 500 of the illustrated example, BD-PSNR is plotted as a function of quantization offset, s, configured by the video encoder 100 as a fraction of the quantization step size, q, over the range of $1/16$ to 8/16. The BD-PSNR performance curves depicted in the graph 500 of FIG. 5 are normalized relative to the BD-PSNR achieved when the quantization step offset, s, is set to a fraction of $1/16$ of the quantization step size, q. The graph 500 indicates that a quantization step offset, s, set to 6/16 of the quantization step size, q (i.e., 6q/16), yields the best (e.g., highest) performance in terms of BD-PSNR for intra-frame encoding in the illustrated example.

The example table 600 of FIG. 6 presents the data of FIG. 5 in tabular format.

Figures 7, 8:
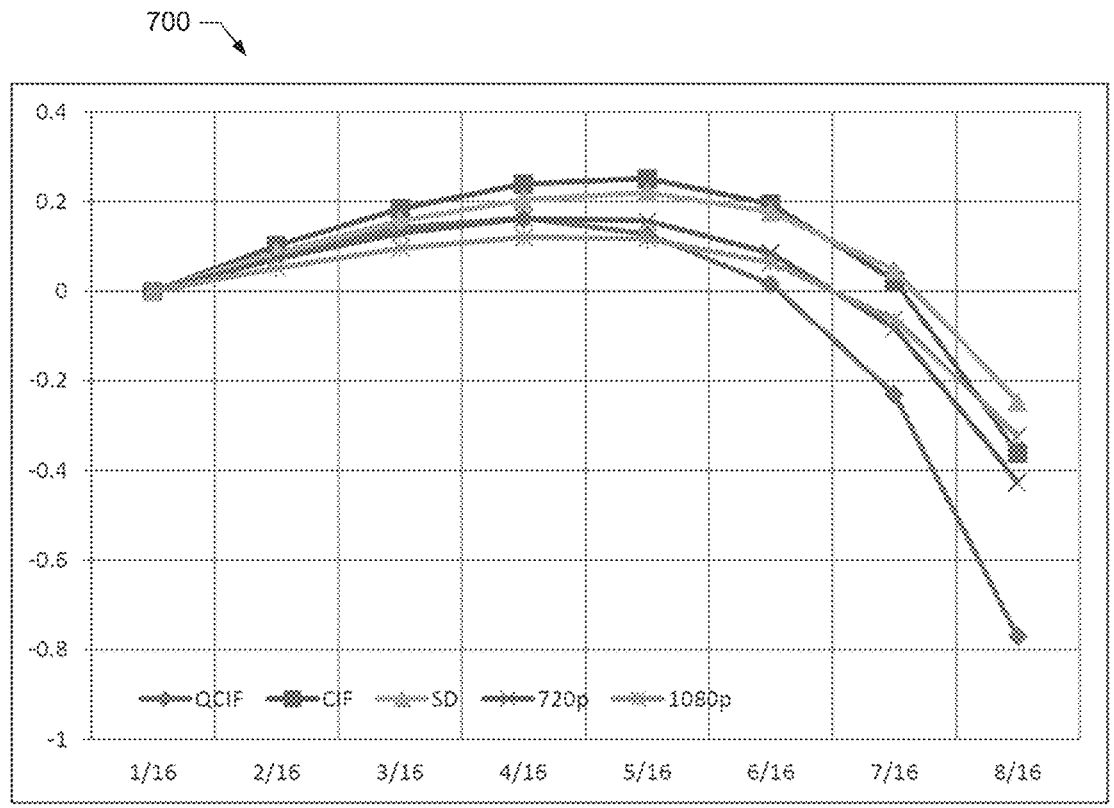

The example graph 700 of FIG. 7 depicts BD-PSNR for inter-frame encoding of pixel blocks over different video resolutions (QCIF, CF, SD, 720 p and 1080 p) and for QP values in the range of [22, 27, 32, 37]. In the graph 700 of the illustrated example, BD-PSNR is plotted as a function of quantization offset, s, configured by the video encoder 100 as a fraction of the quantization step size, q, over the range of $1/16$ to 8/16. The BD-PSNR performance curves depicted in the graph 700 of FIG. 7 are normalized relative to the BD-PSNR achieved when the quantization step offset, s, is set to a fraction of $1/16$ of the quantization step size, q. The graph 500 indicates that, depending on the video resolution, a quantization step offset, s, set to 4/16 or $5/16$ of the quantization step size, q (i.e., 4q/16 or 5q/16), yields the best (e.g., highest) performance in terms of BD-PSNR for intra-frame encoding in the illustrated example.

The example table 800 of FIG. 8 presents the data of FIG. 7 in tabular format.

As noted above, the quality of a pixel block (e.g., macroblock) that may be used as a reference for other pixel blocks may have more impact on overall video encoding quality than the quality of a non-reference pixel block. Thus, improving the quality of encoded reference pixel blocks may provide more of a benefit to the quality of the overall encoded video sequence than improving the quality of non-reference pixel blocks. As also noted above, in some video coding standards, pixel blocks in I and P frames may be used as reference blocks, but pixel blocks in B frames are generally not used as reference blocks. Accordingly, in some examples in which a target bit rate is specified during the encoding process, an encoder bit rate control algorithm implemented by the video encoder 100 calculates the target frame size and QP for each pixel block or frame, and use different QP values (e.g., different quantization step sizes) for different pixel block types depending on whether the blocks are (or may be) reference blocks or non-reference block.

Besides using different QP values (e.g., different quantization step sizes) for different pixel block type (e.g., reference v. non-reference blocks), the example video encoder 100 described herein can further modify the quantization offset, s, to be different for different block types. From a statistics point of view, using a higher quantization offset may generate, on average, more non-zero coefficients and, thus, yield a higher bit rate, whereas using a lower quantization offset may generate fewer non-zero transform coefficients and, thus, yield a lower bit rate. Accordingly, in some examples, the video encoder 100 configures or otherwise adjusts the quantization offset to be a fraction of 1/16 of the quantization step size, or some other small value, for pixel blocks that will not be used as a reference. However, for pixel blocks that may be used as a reference, the video encoder 100 configures or otherwise adjusts the quantization offset to be a fraction of 4/16 of the quantization step size, or some other larger value. In such examples, bits saved by using a lower quantization offset for the non-reference blocks can be allocated to the reference blocks, which may to improve the quality of the reference pixel blocks, and, thus, improve the quality of the overall encoded video sequence.

Figure 9:
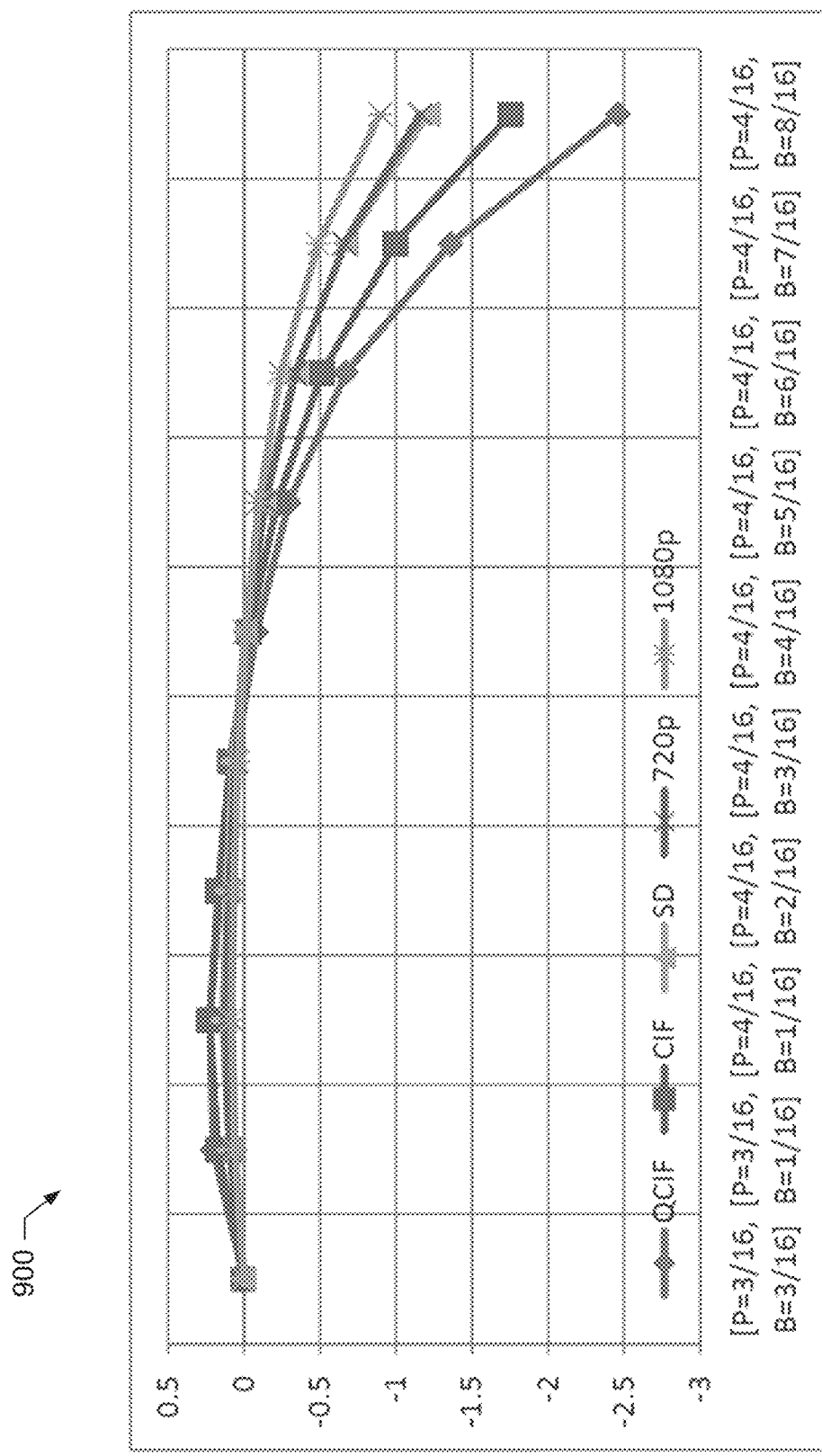

The graph 900 illustrated in FIG. 9 exhibits example performance results that may be achieved using different quantization offsets for reference pixel blocks (e.g., such a P frame blocks) and non-reference pixel blocks (e.g., such as B frame blocks). In the example graph 900 of FIG. 9, BD-PSNR is depicted over different video resolutions (QCIF, CF, SD, 720 p and 1080 p) and for QP values in the range of [22, 27, 32, 37]. In the graph 900 of the illustrated example, BD-PSNR is plotted as a function of different combinations of quantization offsets configured by the video encoder 100 for quantizing P frame blocks vs. B frame blocks, with the quantization offsets being specified as a fraction of the quantization step size, q, over the range of 1/16 to 8/16. The BD-PSNR performance curves depicted in the graph 900 of FIG. 9 are normalized relative to the BD-PSNR achieved when the quantization step offset combination is set to a fraction of 3/16 of the quantization step size, q, for both the P frame blocks and the B frame blocks. The graph 900 indicates that combination of setting the quantization offset to 4/16 of the quantization step size, q (i.e., 4q/16) for P frame blocks and setting the quantization offset to 1/16 of the quantization step size, q (i.e., q/16) for B frame blocks yields the best (e.g., highest) performance in terms of BD-PSNR in the illustrated example.

The example table 1000 of FIG. 10 presents the data of FIG. 9 in tabular format.

From a psycho-visual point of view, viewers may not be able to distinguish visual quality differences for high motion video and/or for video containing high amounts of texture details. However, pixel blocks associated with high motion video and/or high texture detail may have high intra/inter prediction residuals, which use more bits to encode. As noted above, in some examples, the video encoder 100 adjusts the quantization offset based on the characteristics of the pixel blocks. For example, for blocks with a higher level of motion and/or a higher amount of texture details, the video encoder 100 can reduce the quantization offset to a small value, such as 1/16 of quantization step size (i.e., q/16) to reduce the amount of bits that the video encoder 100 will generate while having little effect on the psycho-visual of the encoded video.

The examples performance results of FIGS. 5-10 illustrate that empirical results may be used to determine the quantization offsets to be configured by the video encoder 100 for different QP values (e.g., quantization step sizes) and/or characteristics of the pixel blocks being encoded. In such examples, the different possible values of QP and/or the different possible characteristics of the pixel block may be used as indices into a lookup table, data array, database, etc., containing quantization offset and/or cost factor values to be selected for use by the video encoder 100. Additionally or alternatively, mathematical formulas/functions may be specified or otherwise made available to the video encoder 100 for use in configuring the quantization offsets for different QP values (e.g., quantization step sizes) and/or characteristics of the pixel blocks being encoded. In such examples, the different possible values of QP and/or the different possible characteristics of the pixel block may be used as inputs into the mathematical formulas/functions for determining the quantization offset and/or cost factor values to be used by the video encoder 100.

While example manners of implementing the video encoder 100 are illustrated in FIGS. 1-4, one or more of the elements, processes and/or devices illustrated in FIGS. 1-4 may be combined, divided, re-arranged, omitted, eliminated and/or implemented in any other way. Further, the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420, the example cost factor storage 430 and/or, more generally, the example video encoder 100 of FIGS. 1-4 may be implemented by hardware, software, firmware and/or any combination of hardware, software and/or firmware. Thus, for example, any of the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420, the example cost factor storage 430 and/or, more generally, the example video encoder 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video encoder 100, the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420 and/or the example cost factor storage 430 is/are hereby expressly defined to include a tangible computer readable storage device or storage disk such as a memory, a digital versatile disk (DVD), a compact disk (CD), a Blu-ray disk, etc. storing the software and/or firmware. Further still, the example video encoder 100 may include one or more elements, processes and/or devices in addition to, or instead of, those illustrated in FIGS. 1-4, and/or may include more than one of any or all of the illustrated elements, processes and devices.

Figure 11:
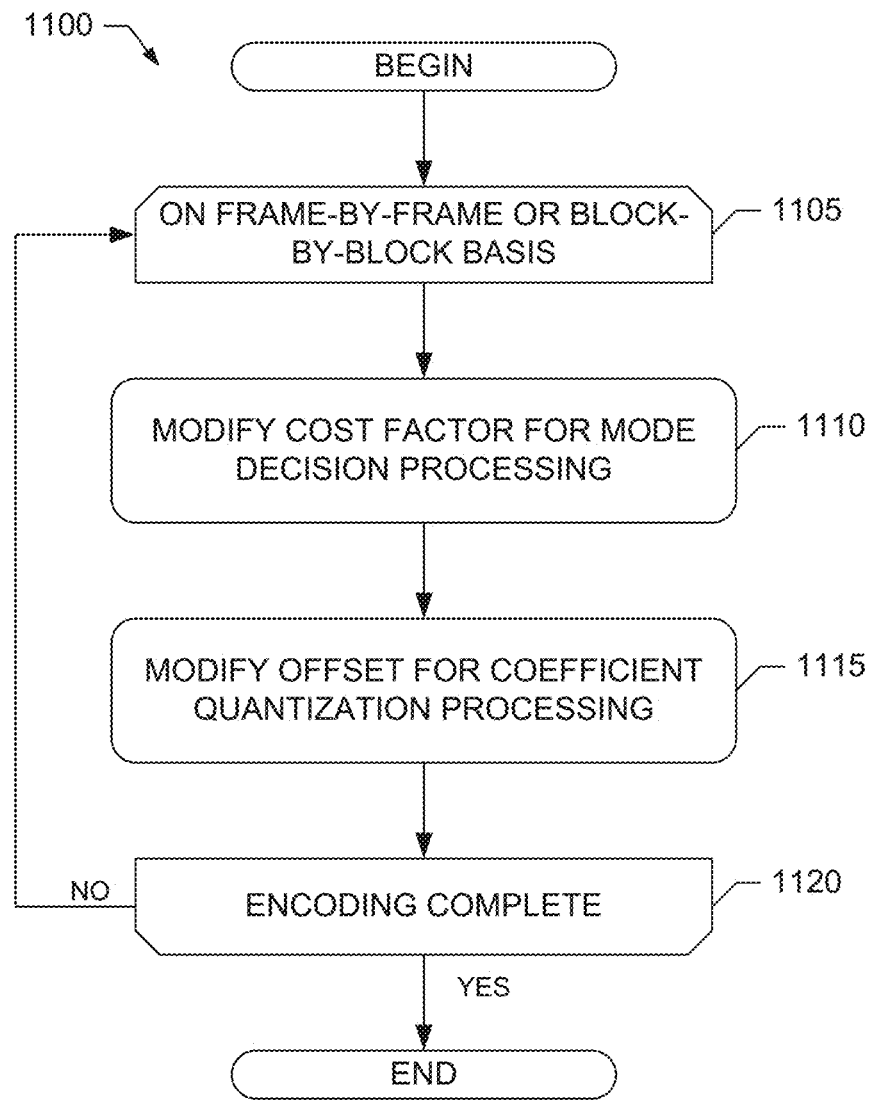
FIG. 11 is a flowchart representative of example machine readable instructions that may be executed to implement the example video encoder of FIG. 1.
Figure 12:
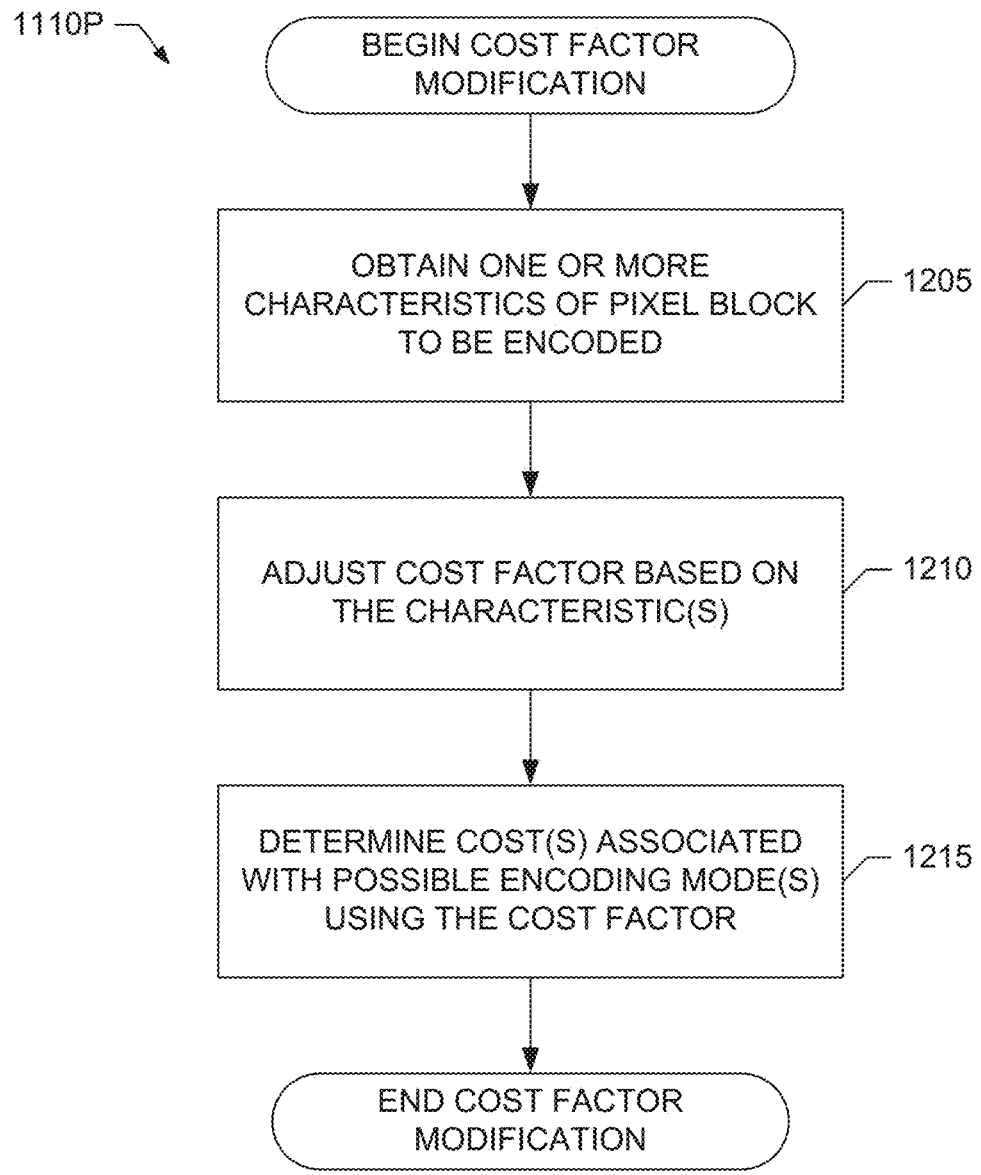
FIG. 12 is a flowchart representative of example machine readable instructions that may be executed to implement the example motion estimation and mode decision processor of FIG. 4 and/or cost factor modification in the example video encoder of FIG. 1.
Figure 13:
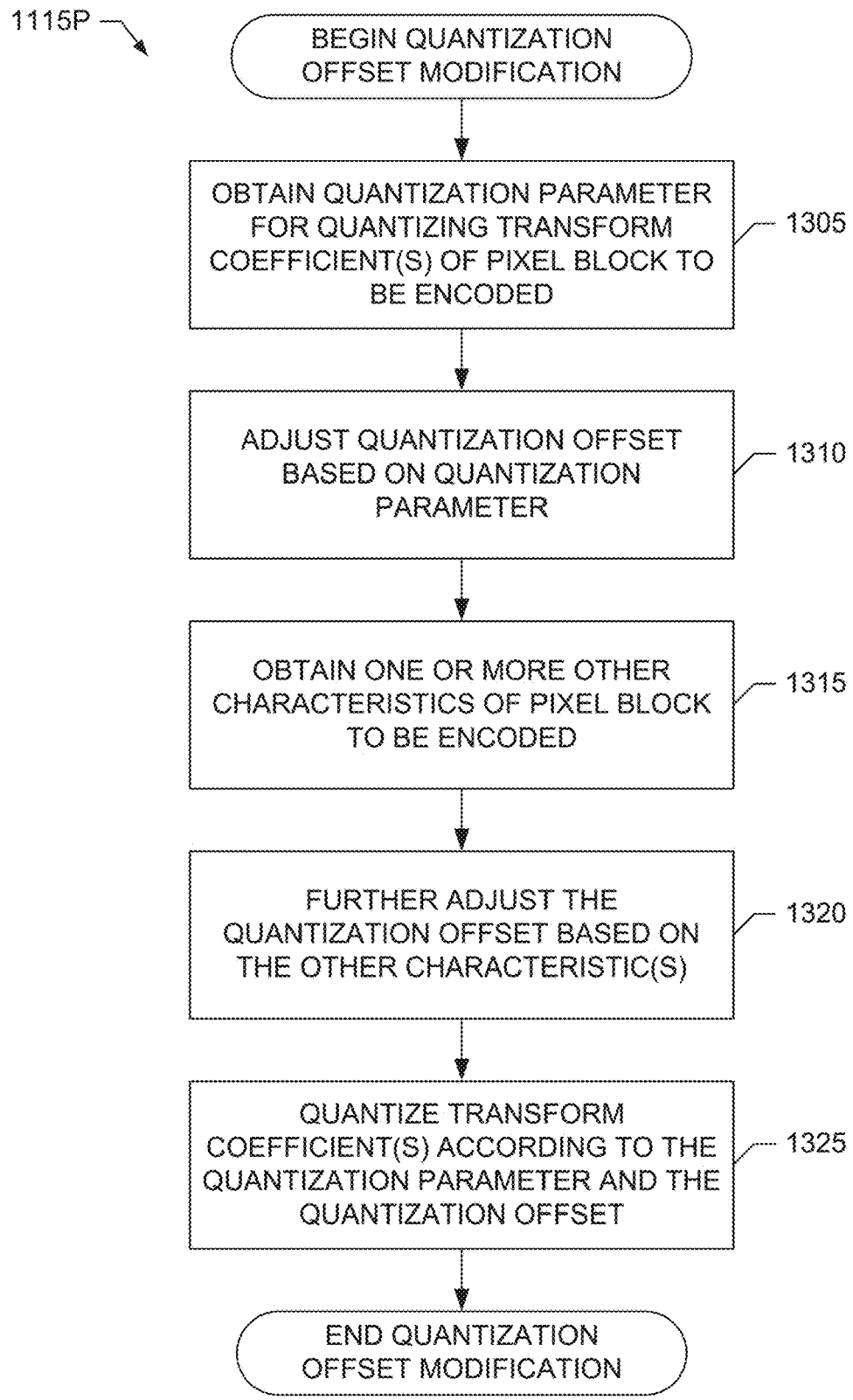
FIG. 13 is a flowchart representative of example machine readable instructions that may be executed to implement the example transformer and quantizer of FIG. 2 and/or quantization offset modification in the example video encoder of FIG. 1.

Flowcharts representative of example machine readable instructions for implementing the example video encoder 100, the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420 and/or the example cost factor storage 430 are shown in FIGS. 11-13. In these examples, the machine readable instructions comprise one or more programs for execution by a processor, such as the processor 1410 shown in the example system 1400 discussed below in connection with FIG. 14. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1410, but the entire program or programs and/or portions thereof could alternatively be executed by a device other than the processor 1410 and/or embodied in firmware or dedicated hardware (e.g., implemented by an ASIC, a PLD, an FPLD, discrete logic, etc.). Also, one or more of the machine readable instructions represented by the flowcharts of FIGS. 11-13 may be implemented manually. Further, although the example program(s) is(are) described with reference to the flowcharts illustrated in FIGS. 11-13, many other methods of implementing the example video encoder 100, the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420 and/or the example cost factor storage 430 may alternatively be used. For example, with reference to the flowcharts illustrated in FIGS. 11-13, the order of execution of the blocks may be changed, and/or some of the blocks described may be changed, eliminated, combined and/or subdivided into multiple blocks.

As mentioned above, the example processes of FIGS. 11-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-13 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 1100 that may be executed to implement the example video encoder 100 of FIG. 1 is represented by the flowchart shown in FIG. 11. The example program 1100 may be executed by the video encoder 100 to encode video data in which video frames of data are segmented in pixel blocks (e.g., such as macroblocks, pixel blocks, etc.) With reference to the preceding figures and associated written descriptions, the example program 1100 of FIG. 11 begins execution at block 1105 at which the video encoder 100 is configured to modify, on a block-by-block basis or a frame-by-frame basis, the quantization offset, s, and/or the cost factor, λ, used for video encoding, as described above.

At block 1110, the example cost factor adjuster 420 modifies the cost factor, λ, to be used by the cost calculator 405 during encoding type/mode selection for a given pixel block (or frame of pixel blocks) being encoded by the video encoder 100. As described above, the cost factor adjuster 420 configures the cost factor at block 1100 based on, for example, one or more characteristics of the pixel block (or frame of pixel blocks) being encoded. Example machine readable instructions that may be used to implement the processing at block 1100 are illustrated in FIG. 12 and described in further detail below.

At block 1115, the example offset determiner 215 modifies the quantization offset, s, to be used by the quantizer 205 for quantizing a given pixel block (or frame of pixel blocks) being encoded by the video encoder 100. As described above, the offset determiner 215 selects the quantization offset at block 1115 based on, for example, the quantization step size, q, (or the QP indexing the step size, q) to be used by the quantizer 205 and/or one or more characteristics of the pixel block (or frame of pixel blocks) being encoded. Example machine readable instructions that may be used to implement the processing at block 1115 are illustrated in FIG. 13 and described in further detail below.

At block 1120, the video encoder 100 causes the processing at blocks 1105-1115 to continue to be performed until encoding of the video data is completed. After encoding is complete, execution of the example program 1100 ends.

An example program 1110P that may be executed to implement the example motion estimation and mode decision processor 110 of FIGS. 1 and/or 4, and/or used to implement the processing at block 1110 of FIG. 11, is represented by the flowchart shown in FIG. 12. With reference to the preceding figures and associated written descriptions, the example program 1110P of FIG. 12 begins execution at block 1205 at which the example cost factor adjuster 420 obtains one or more characteristics of a given pixel block (or frame of pixel blocks) to be encoded, as described above. At block 1210, the cost factor adjuster 420 adjusts or otherwise determines, based on the characteristic(s) obtained at block 1205, the cost factor, $\lambda$, to be used by the cost calculator 405 during encoding type/mode selection for a given pixel block (or frame of pixel blocks) being encoded, as described above. At block 1215, the example cost calculator 405 uses the cost factor, $\lambda$, configured at block 1210 to determine the cost(s), such as rate-distortion costs, associated with different possible encoding type(s)/mode(s) for encoding the given pixel block (or frame of pixel blocks), as described above.

An example program 1115P that may be executed to implement the example transformer and quantizer 120 of FIGS. 1 and/or 2, and/or used to implement the processing at block 1115 of FIG. 11, is represented by the flowchart shown in FIG. 13. With reference to the preceding figures and associated written descriptions, the example program 1115P of FIG. 13 begins execution at block 1305 at which the example offset determiner 215 obtains the QP (or, for example, the quantization step size) to be used by the quantizer 205 to quantize a given pixel block (or frame of pixel blocks) to be encoded, as described above. At block 1310, the offset determiner 215 adjusts or otherwise determines, based on the QP (or, for example, quantization step size) obtained at block 1305, the quantization offset, s, to be used by the quantizer 205 to quantize the given pixel block (or frame of pixel blocks), as described above. At block 1315, the offset determiner 215 obtains one or more characteristics of the given pixel block (or frame of pixel blocks) to be encoded, as described above. At block 1320, the offset determiner 215 further adjusts or otherwise determines, based on the characteristic(s) obtained at block 1315, the quantization offset, s, to be used by the quantizer 205 to quantize the given pixel block (or frame of pixel blocks), as described above. At block 1325, the example quantizer 205 quantizes the transform coefficient(s) representative of the given pixel block (or frame of pixel blocks) to be encoded using the QP (or, for example, quantization step size) obtained at block 1305 and the quantization offset, s, determined by the processing at blocks 1310 and/or 1320, as described above.

Figure 14:
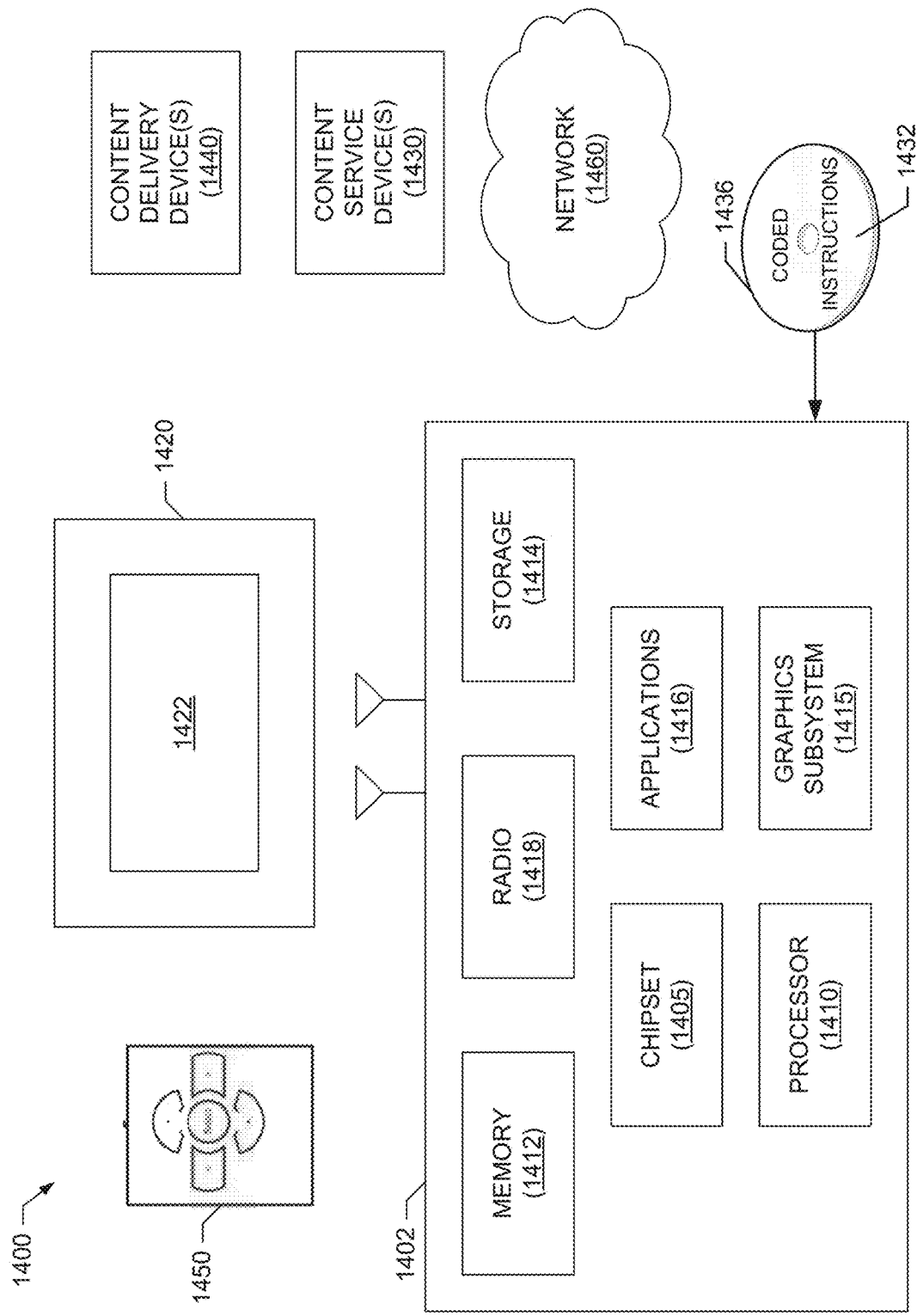
FIG. 14 is a block diagram of an example system that may execute the example machine readable instructions of FIGS. 11-12 and/or 13 to implement the example video encoder of FIG. 1, the example transformer and quantizer of FIG. 2 and/or the example motion estimation and mode decision processor of FIG. 4.

FIG. 14 illustrates an example system 1400 capable of executing the instructions of FIGS. 11-13 to implement the example video encoder 100, the example video encoding engine 105, the example motion estimation and mode decision processor 110, the example motion compensator 115, the example transformer and quantizer 120, the example entropy encoder 125, the example quantizer 205, the example step-size determiner 210, the example offset determiner 215, the example offset storage 220, the example cost calculator 405, the example distortion value determiner 410, the example rate value determiner 415, the example cost factor adjuster 420 and/or the example cost factor storage 430 of FIGS. 1-4. In some examples, system 1400 may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In some examples, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In some examples, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In some examples, processor 1410 may be dualcore processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The example graphics and/or video processing techniques disclosed herein may be implemented in various hardware architectures. For example, graphics and/or video functionality may be integrated within a chipset. Additionally or alternatively, a discrete graphics and/or video processor may be used. In some examples, the graphics and/or video functions may be provided by a general purpose processor, including a multi-core processor. In some examples, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In some examples, display 1420 may include any television type monitor or display. Display 1420 may include, for example, a computer display screen, touch screen display, video monitor, television-like device, and/or a television. Display 1420 may be digital and/or analog. In some examples, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In some examples, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In some examples, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In some examples, platform 1402 may receive control signals from navigation controller 1450 having one or more navigation features. The navigation features of controller 1450 may be used to interact with user interface 1422, for example. In some examples, navigation controller 1450 may be a pointing device that may be a computer hardware component (specifically, a human interface device) that allows a user to input spatial (e.g., continuous and multidimensional) data into a computer. Systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In some examples, controller 1450 may not be a separate component but may be integrated into platform 1402 and/or display 1420. The present disclosure, however, is not limited to the elements or in the context shown or described herein.

In some examples, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In some examples, the graphics driver may comprise a peripheral component interconnect (PCI) Express graphics card.

In some examples, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In some examples, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In some examples, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The disclosure, however, are not limited to the elements or in the context shown or described in FIG. 14.

Coded instructions 1432 corresponding to the instructions of FIGS. 11-13 may be stored in the storage 1414, in the memory 1412 and/or on a removable tangible computer readable storage medium, such as a CD or DVD 1436.

Figure 15:
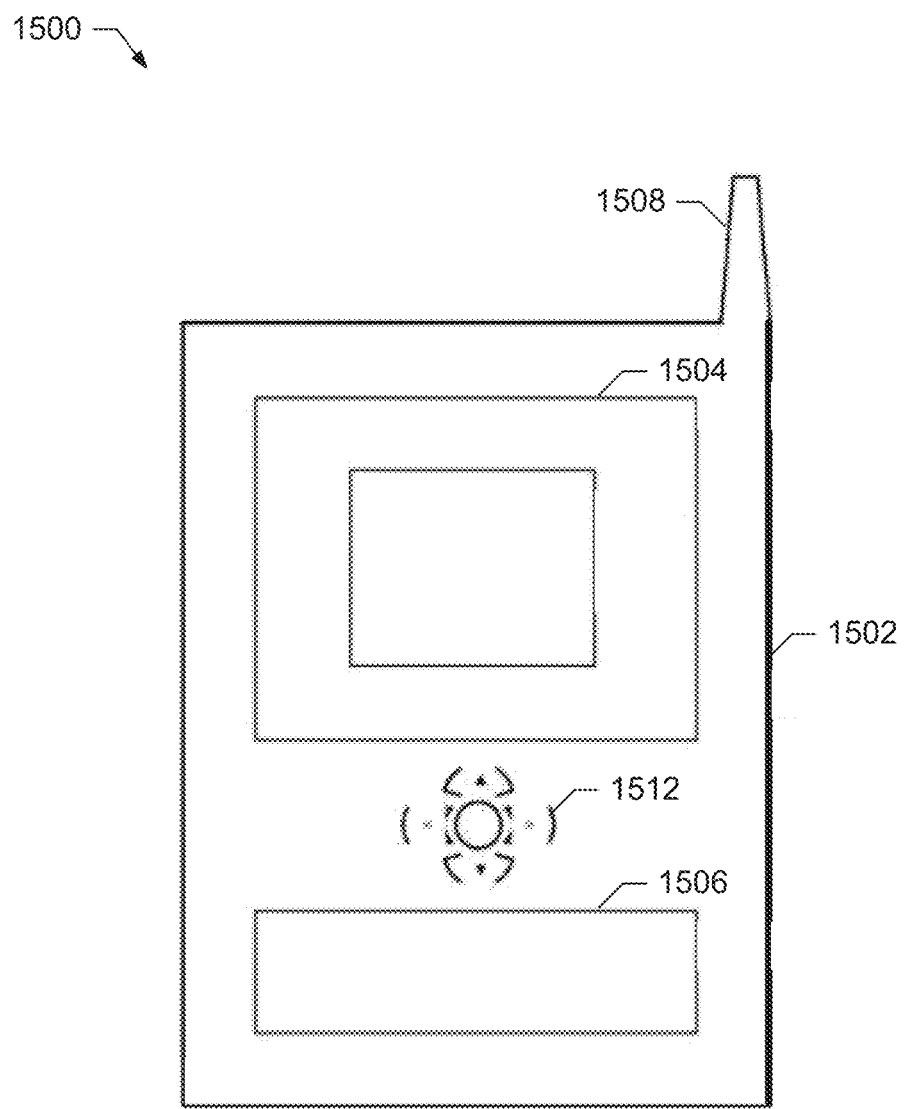
FIG. 15 is a block diagram of an example device that may include the example system of FIG. 14.

The example system 1400 may be implemented in varying physical styles or form factors. FIG. 15 illustrates an example of a small form factor device 1500 in which the example system 1400 may be implemented. In some examples, device 1500 may be implemented as a mobile computing device a having wireless capabilities. A mobile computing device may refer to any device intended to be carried by a person in ordinary use and having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device may include computers that are arranged to be worn by a person, such as a wrist computer, finger computer, ring computer, eyeglass computer, belt-clip computer, arm-band computer, shoe computers, clothing computers, and other wearable computers. In some examples, for example, a mobile computing device may be implemented as a smart phone capable of executing computer applications, as well as voice communications and/or data communications. Although some examples are described herein with a mobile computing device implemented as a smart phone by way of example, other examples are implemented using other wireless mobile computing devices. The present disclosure is not limited to the specific examples described.

As shown in FIG. 15, the device 1500 includes a housing 1502, a display 1504, an input/output (I/O) device 1506, and an antenna 1508. The example device 1500 also includes navigation features 1512. The display 1504 of FIG. 15 includes any suitable display unit for displaying information appropriate for a mobile computing device. The I/O device 1506 may be implemented by any suitable I/O device for entering information into a mobile computing device. The example I/O device 1506 may be implemented by an alphanumeric keyboard, a numeric keypad, a touch pad, input keys, buttons, switches, rocker switches, microphones, speakers, voice recognition device and software, and/or other structures. Information also may be entered into device 1500 by way of a microphone. Such information may be digitized by a voice recognition device. The present disclosure is not limited to the specific examples described.

Quantization offset and/or cost factor modification for video encoding as disclosed herein may be implemented using hardware, software, or a combination of hardware and software. Examples of hardware include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and/or any combination thereof. Examples of software include software structures, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, and/or any combination thereof. Determining whether an example is implemented using hardware and/or software may vary in accordance with any number of factors, such as desired computational rate, power levels, heat tolerances, processing cycle budget, input data rates, output data rates, memory resources, data bus speeds and/or other design or performance constraints.

The following further examples include subject matter such as a method to perform quantization offset and/or cost factor modification for video encoding, means for performing quantization offset and/or cost factor modification for video encoding, a machine-readable medium including instructions that, when performed by a machine cause the machine to perform quantization offset and/or cost factor modification for video encoding, an apparatus and/or a system to perform quantization offset and/or cost factor modification for video encoding as disclosed herein.

Example 1 is a method for video encoding, the method including obtaining a quantization parameter to quantize a transform coefficient representative of a pixel block in a frame of a video sequence. The method of example 1 also includes adjusting, with a processor, a quantization offset to quantize the transform coefficient, the adjusting of the quantization offset being based on the quantization parameter. The method of example 1 further includes quantizing the transform coefficient according to the quantization parameter and the quantization offset.

Example 2 includes the subject matter of example 1, wherein the quantization parameter corresponds to an index identifying a quantization step size.

Example 3 includes the subject matter of example 2, wherein adjusting the quantization offset further includes setting the quantization offset to a first fraction of the quantization step size when the quantization step size is a first value, and setting the quantization offset to a second fraction of the quantization step size when the quantization step size is a second value, the second fraction being different from the first fraction.

Example 4 includes the subject matter of example 1, wherein adjusting the quantization offset further includes determining a type of encoding used to encode the pixel block, the type of encoding being at least one of intra-frame encoding or inter-frame encoding, and adjusting the quantization offset based on the quantization parameter and the type of encoding used to encode the pixel block.

Example 5 includes the subject matter of example 1, wherein adjusting the quantization offset further includes determining whether the pixel block is a reference block to be used to encode other pixel blocks, and adjusting the quantization offset based on the quantization parameter and whether the pixel block is determined to be a reference block.

Example 6 includes the subject matter of example 5, wherein adjusting the quantization offset further includes setting the quantization offset based on the quantization parameter, and decreasing the quantization offset when the pixel block is determined to not be a reference block.

Example 7 includes the subject matter of example 1, wherein adjusting the quantization offset further includes adjusting the quantization offset based on the quantization parameter and a resolution of the frame of the video sequence.

Example 8 includes the subject matter of example 1, wherein adjusting the quantization offset further includes adjusting the quantization offset based on the quantization parameter and a characteristic of the pixel block, the characteristic indicating at least one of an amount of motion or an amount of texture detail associated with the pixel block.

Example 9 includes the subject matter of example 1, wherein adjusting the quantization offset includes dynamically adjusting the quantization offset on at least one of a frame-by-frame basis or a block-by-block basis.

Example 10 includes the subject matter of any one of examples 1 to 8, wherein adjusting the quantization offset includes dynamically adjusting the quantization offset on at least one of a frame-by-frame basis or a block-by-block basis.

Example 11 is at least one tangible machine readable storage medium including machine readable instructions which, when executed, cause a machine to at least adjust a quantization offset to quantize a transform coefficient representative of a pixel block in a frame of a video sequence, the adjusting of the quantization offset being based on a quantization parameter to quantize the transform coefficient. The instructions of example 11, when executed, also cause the machine to at least quantize the transform coefficient according to the quantization parameter and the quantization offset.

Example 12 includes the subject matter of example 11, wherein the quantization parameter corresponds to an index identifying a quantization step size.

Example 13 includes the subject matter of example 12, wherein the machine readable instructions, when executed, further cause the machine to set the quantization offset to a first fraction of the quantization step size when the quantization step size is a first value, and set the quantization offset to a second fraction of the quantization step size when the quantization step size is a second value, the second fraction being different from the first fraction.

Example 14 includes the subject matter of example 11, wherein the machine readable instructions, when executed, further cause the machine to determine a type of encoding used to encode the pixel block, the type of encoding being at least one of intra-frame encoding or inter-frame encoding, and adjust the quantization offset based on the quantization parameter and the type of encoding used to encode the pixel block.

Example 15 includes the subject matter of example 11, wherein the machine readable instructions, when executed, further cause the machine to determine whether the pixel block is a reference block to be used to encode other pixel blocks, and adjust the quantization offset based on the quantization parameter and whether the pixel block is determined to be a reference block.

Example 16 includes the subject matter of example 15, wherein the machine readable instructions, when executed, further cause the machine to set the quantization offset based on the quantization parameter, and decrease the quantization offset when the pixel block is determined to not be a reference block.

Example 17 includes the subject matter of example 11, wherein the machine readable instructions, when executed, further cause the machine to adjust the quantization offset based on the quantization parameter and a resolution of the frame of the video sequence.

Example 18 includes the subject matter of example 11, wherein the machine readable instructions, when executed, further cause the machine to adjust the quantization offset based on the quantization parameter and a characteristic of the pixel block, the characteristic indicating at least one of an amount of motion or an amount of texture detail associated with the pixel block.

Example 19 includes the subject matter of example 11, wherein the machine readable instructions, when executed, further cause the machine to adjust the quantization offset dynamically on at least one of a frame-by-frame basis or a block-by-block basis.

Example 20 includes the subject matter of any one of examples 11 to 18, wherein the machine readable instructions, when executed, further cause the machine to adjust the quantization offset dynamically on at least one of a frame-by-frame basis or a block-by-block basis.

Example 21 is at least one tangible machine readable storage medium including machine readable instructions which, when executed, cause a machine to perform a method as defined in any one of examples 1 to 10.

Example 22 is a video encoder including an offset determiner to adjust a quantization offset to quantize a transform coefficient representative of a pixel block in a frame of a video sequence, the quantization offset to be adjusted based on a quantization parameter to quantize the transform coefficient. The video encoder of example 22 also includes a quantizer to quantize the transform coefficient according to the quantization parameter and the quantization offset.

Example 23 includes the subject matter of example 22, wherein the quantization parameter corresponds to an index identifying a quantization step size.

Example 24 includes the subject matter of example 23, wherein the offset determiner is further to set the quantization offset to a first fraction of the quantization step size when the quantization step size is a first value, and set the quantization offset to a second fraction of the quantization step size when the quantization step size is a second value, the second fraction being different from the first fraction.

Example 25 includes the subject matter of example 22, wherein the offset determiner is further to determine a type of encoding used to encode the pixel block, the type of encoding being at least one of intra-frame encoding or inter-frame encoding, and adjust the quantization offset based on the quantization parameter and the type of encoding used to encode the pixel block.

Example 26 includes the subject matter of example 22, wherein the offset determiner is further to determine whether the pixel block is a reference block to be used to encode other pixel blocks, and adjust the quantization offset based on the quantization parameter and whether the pixel block is determined to be a reference block.

Example 27 includes the subject matter of example 26, wherein the offset determiner is further to set the quantization offset based on the quantization parameter, and decrease the quantization offset when the pixel block is determined to not be a reference block.

Example 28 includes the subject matter of example 22, wherein the offset determiner is further to adjust the quantization offset based on the quantization parameter and a resolution of the frame of the video sequence.

Example 29 includes the subject matter of example 22, wherein the offset determiner is further to adjust the quantization offset based on the quantization parameter and a characteristic of the pixel block, the characteristic indicating at least one of an amount of motion or an amount of texture detail associated with the pixel block.

Example 30 includes the subject matter of example 22, wherein the offset determiner is to dynamically adjust the quantization offset on at least one of a frame-by-frame basis or a block-by-block basis.

Example 31 includes the subject matter of any one of examples 22 to 29, wherein the offset determiner is to dynamically adjust the quantization offset on at least one of a frame-by-frame basis or a block-by-block basis.

Example 32 is a video encoder configured to perform a method as defined in any one of examples 1 to 10.

Example 33 is an apparatus for video encoding, the apparatus including means for obtaining a quantization parameter to quantize a transform coefficient representative of a pixel block in a frame of a video sequence. The apparatus of example 33 also includes means for adjusting a quantization offset to quantize the transform coefficient, the adjusting of the quantization offset being based on the quantization parameter. The apparatus of example 33 further includes means for quantizing the transform coefficient according to the quantization parameter and the quantization offset.

Example 34 includes the subject matter of example 33, wherein the quantization parameter corresponds to an index identifying a quantization step size.

Example 35 includes the subject matter of example 34, wherein the adjusting means further includes means for setting the quantization offset to a first fraction of the quantization step size when the quantization step size is a first value, and means for setting the quantization offset to a second fraction of the quantization step size when the quantization step size is a second value, the second fraction being different from the first fraction.

Example 36 includes the subject matter of example 33, wherein the adjusting means further includes means for determining a type of encoding used to encode the pixel block, the type of encoding being at least one of intra-frame encoding or inter-frame encoding, and means for adjusting the quantization offset based on the quantization parameter and the type of encoding used to encode the pixel block.

Example 37 includes the subject matter of example 33, wherein the adjusting means further includes means for determining whether the pixel block is a reference block to be used to encode other pixel blocks, and means for adjusting the quantization offset based on the quantization parameter and whether the pixel block is determined to be a reference block.

Example 38 includes the subject matter of example 37, wherein the adjusting means further includes means for setting the quantization offset based on the quantization parameter, and means for decreasing the quantization offset when the pixel block is determined to not be a reference block.

Example 39 includes the subject matter of example 33, wherein the adjusting means further includes means for adjusting the quantization offset based on the quantization parameter and a resolution of the frame of the video sequence.

Example 40 includes the subject matter of example 33, wherein the adjusting means further includes means for adjusting the quantization offset based on the quantization parameter and a characteristic of the pixel block, the characteristic indicating at least one of an amount of motion or an amount of texture detail associated with the pixel block.

Example 41 includes the subject matter of example 33, wherein the adjusting means further includes means for dynamically adjusting the quantization offset on at least one of a frame-by-frame basis or a block-by-block basis.

Example 42 includes the subject matter of any one of examples 33 to 40, wherein the adjusting means further includes means for dynamically adjusting the quantization offset on at least one of a frame-by-frame basis or a block-by-block basis.

Example 43 is an apparatus including means for performing a method as defined in any one of examples 1 to 10.

Example 44 is a method for video encoding, the method including adjusting, with a processor, a cost factor based on a characteristic of a pixel block in a frame of a video sequence. The method of example 44 also includes determining, with the processor and based on the cost factor, a cost associated with encoding the pixel block according to a first encoding mode, the cost being a combination of a distortion value associated with the first encoding mode and a rate value associated with the first encoding mode, the rate value being scaled by the cost factor.

Example 45 includes the subject matter of example 44, wherein the characteristic indicates at least one of an amount of motion or an amount of texture detail associated with the pixel block.

Example 46 includes the subject matter of example 45, wherein the characteristic indicates the amount of motion associated with the pixel block, and adjusting the cost factor further includes setting the cost factor to a first value when the amount of motion associated with the pixel block satisfies a threshold amount of motion, and setting the cost factor to a second value less than the first value when the amount of motion associated with the pixel block does not satisfy the threshold amount of motion.

Example 47 includes the subject matter of example 45, wherein the characteristic indicates the amount of texture detail associated with the pixel block, and adjusting the cost factor further includes setting the cost factor to a first value when the amount of texture detail associated with the pixel block satisfies a threshold, and setting the cost factor to a second value less than the first value when the amount of texture detail associated with the pixel block does not satisfy the threshold.

Example 48 includes the subject matter of example 44, wherein adjusting the cost factor further includes determining whether the pixel block is a reference block to be used for encoding other pixel blocks, and adjusting the cost factor based on the characteristic of the pixel block and whether the pixel block is determined to be a reference block.

Example 49 includes the subject matter of example 48, wherein adjusting the cost factor further includes setting the cost factor based on the characteristic of the pixel block, and increasing the cost factor when the pixel block is determined to not be a reference block.

Example 50 includes the subject matter of example 44, wherein adjusting the cost factor further includes adjusting the cost factor based on the characteristic of the pixel block and a quantization parameter for quantizing a transform coefficient representative of the pixel block.

Example 51 includes the subject matter of example 44, wherein the cost factor is dynamically adjusted on at least one of a frame-by-frame basis or a block-by-block basis.

Example 52 includes the subject matter of any one of examples 44 to 50, wherein the cost factor is dynamically adjusted on at least one of a frame-by-frame basis or a block-by-block basis.

Example 53 is at least one tangible machine readable storage medium including machine readable instructions which, when executed, cause a machine to at least adjust a cost factor based on a characteristic of a pixel block in a frame of a video sequence. The instructions of example 53, when executed, also cause the machine to at least determine, based on the cost factor, a cost associated with encoding the pixel block according to a first encoding mode, the cost being a combination of a distortion value associated with the first encoding mode and a rate value associated with the first encoding mode, the rate value being scaled by the cost factor.

Example 54 includes the subject matter of example 53, wherein the characteristic indicates at least one of an amount of motion or an amount of texture detail associated with the pixel block.

Example 55 includes the subject matter of example 54, wherein the characteristic indicates the amount of motion associated with the pixel block, and the machine readable instructions, when executed, further cause the machine to set the cost factor to a first value when the amount of motion associated with the pixel block satisfies a threshold amount of motion, and set the cost factor to a second value less than the first value when the amount of motion associated with the pixel block does not satisfy the threshold amount of motion.

Example 56 includes the subject matter of example 54, wherein the characteristic indicates the amount of texture detail associated with the pixel block, and the machine readable instructions, when executed, further cause the machine to set the cost factor to a first value when the amount of texture detail associated with the pixel block satisfies a threshold, and set the cost factor to a second value less than the first value when the amount of texture detail associated with the pixel block does not satisfy the threshold.

Example 57 includes the subject matter of example 53, wherein the machine readable instructions, when executed, further cause the machine to determine whether the pixel block is a reference block to be used for encoding other pixel blocks, and adjust the cost factor based on the characteristic of the pixel block and whether the pixel block is determined to be a reference block.

Example 58 includes the subject matter of example 57, wherein the machine readable instructions, when executed, further cause the machine to set the cost factor based on the characteristic of the pixel block, and increase the cost factor when the pixel block is determined to not be a reference block.

Example 59 includes the subject matter of example 53, wherein the machine readable instructions, when executed, further cause the machine to adjust the cost factor based on the characteristic of the pixel block and a quantization parameter for quantizing a transform coefficient representative of the pixel block.

Example 60 includes the subject matter of example 53, wherein the machine readable instructions, when executed, further cause the machine to dynamically adjust the cost factor on at least one of a frame-by-frame basis or a block-by-block basis.

Example 61 includes the subject matter of any one of examples 53 to 59, wherein the machine readable instructions, when executed, further cause the machine to dynamically adjust the cost factor on at least one of a frame-by-frame basis or a block-by-block basis.

Example 62 is at least one tangible machine readable storage medium including machine readable instructions which, when executed, cause a machine to perform a method as defined in any one of examples 44 to 52.

Example 63 is a video encoder including a cost factor adjuster to adjust a cost factor based on a characteristic of a pixel block in a frame of a video sequence. The video encoder of example 63 also includes a cost calculator to determine, based on the cost factor, a cost associated with encoding the pixel block according to a first encoding mode, the cost being a combination of a distortion value associated with the first encoding mode and a rate value associated with the first encoding mode, the rate value being scaled by the cost factor.

Example 64 includes the subject matter of example 63, wherein the characteristic indicates at least one of an amount of motion or an amount of texture detail associated with the pixel block.

Example 65 includes the subject matter of example 64, wherein the characteristic indicates the amount of motion associated with the pixel block, and the cost factor adjuster is further to set the cost factor to a first value when the amount of motion associated with the pixel block satisfies a threshold amount of motion, and set the cost factor to a second value less than the first value when the amount of motion associated with the pixel block does not satisfy the threshold amount of motion.

Example 66 includes the subject matter of example 64, wherein the characteristic indicates the amount of texture detail associated with the pixel block, and the cost factor adjuster is further to set the cost factor to a first value when the amount of texture detail associated with the pixel block satisfies a threshold, and set the cost factor to a second value less than the first value when the amount of texture detail associated with the pixel block does not satisfy the threshold.

Example 67 includes the subject matter of example 63, wherein the cost factor adjuster is further to determine whether the pixel block is a reference block to be used to encode other pixel blocks, and adjust the cost factor based on the characteristic of the pixel block and whether the pixel block is determined to be a reference block.

Example 68 includes the subject matter of example 67, wherein the cost factor adjuster is further to set the cost factor based on the characteristic of the pixel block, and increase the cost factor when the pixel block is determined to not be a reference block.

Example 69 includes the subject matter of example 63, wherein the cost factor adjuster is further to adjust the cost factor based on the characteristic of the pixel block and a quantization parameter to quantize a transform coefficient representative of the pixel block.

Example 70 includes the subject matter of example 63, wherein the cost factor adjuster is further to dynamically adjust the cost factor on at least one of a frame-by-frame basis or a block-by-block basis.

Example 71 includes the subject matter of any one of examples 63 to 69, wherein the cost factor adjuster is further to dynamically adjust the cost factor on at least one of a frame-by-frame basis or a block-by-block basis.

Example 72 is a video encoder configured to perform a method as defined in any one of examples 44 to 52.

Example 73 is an apparatus for video encoding, the apparatus including means for adjusting a cost factor based on a characteristic of a pixel block in a frame of a video sequence. The apparatus of example 73 also includes means for determining, based on the cost factor, a cost associated with encoding the pixel block according to a first encoding mode, the cost being a combination of a distortion value associated with the first encoding mode and a rate value associated with the first encoding mode, the rate value being scaled by the cost factor.

Example 74 includes the subject matter of example 73, wherein the characteristic indicates at least one of an amount of motion or an amount of texture detail associated with the pixel block.

Example 75 includes the subject matter of example 74, wherein the characteristic indicates the amount of motion associated with the pixel block, and the adjusting means further includes means for setting the cost factor to a first value when the amount of motion associated with the pixel block satisfies a threshold amount of motion, and means for setting the cost factor to a second value less than the first value when the amount of motion associated with the pixel block does not satisfy the threshold amount of motion.

Example 76 includes the subject matter of example 74, wherein the characteristic indicates the amount of texture detail associated with the pixel block, and the adjusting means further includes means for setting the cost factor to a first value when the amount of texture detail associated with the pixel block satisfies a threshold, and means for setting the cost factor to a second value less than the first value when the amount of texture detail associated with the pixel block does not satisfy the threshold.

Example 77 includes the subject matter of example 73, wherein the adjusting means further includes means for determining whether the pixel block is a reference block to be used for encoding other pixel blocks, and means for adjusting the cost factor based on the characteristic of the pixel block and whether the pixel block is determined to be a reference block.

Example 78 includes the subject matter of example 77, wherein the adjusting means further includes means for setting the cost factor based on the characteristic of the pixel block, and means for increasing the cost factor when the pixel block is determined to not be a reference block.

Example 79 includes the subject matter of example 73, wherein the adjusting means further includes means for adjusting the cost factor based on the characteristic of the pixel block and a quantization parameter for quantizing a transform coefficient representative of the pixel block.

Example 80 includes the subject matter of example 73, wherein the adjusting means further includes means for dynamically adjusting the cost factor on at least one of a frame-by-frame basis or a block-by-block basis.

Example 81 includes the subject matter of any one of examples 73 to 79, wherein the adjusting means further includes means for dynamically adjusting the cost factor on at least one of a frame-by-frame basis or a block-by-block basis.

Example 82 is an apparatus including means for performing a method as defined in any one of examples 44 to 52.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for video encoding, the method comprising:
obtaining a quantization parameter to quantize a transform coefficient representative of a pixel block in a frame of a video sequence;
determining, by executing an instruction with at least one processor, whether the pixel block is a reference block to be used to encode other pixel blocks;
adjusting, by executing an instruction with the at least one processor, a quantization offset to quantize the transform coefficient representative of the pixel block, the adjusting of the quantization offset based on the quantization parameter, the adjusting of the quantization offset also including:
    increasing a value of the quantization offset in response to the pixel block being determined to be a reference block; and
    decreasing the value of the quantization offset in response to the pixel block being determined to not be a reference block; and
quantizing the transform coefficient according to the quantization parameter and the quantization offset.

2. The method as defined in claim 1, wherein the quantization parameter corresponds to an index identifying a quantization step size.

3. The method as defined in claim 2, wherein the adjusting of the quantization offset includes:
setting the quantization offset to a first fraction of the quantization step size when the quantization step size is a first value; and
setting the quantization offset to a second fraction of the quantization step size when the quantization step size is a second value, the second fraction being different from the first fraction.

4. The method as defined in claim 1, wherein the adjusting of the quantization offset further includes:
determining a type of encoding used to encode the pixel block, the type of encoding being at least one of intra-frame encoding or inter-frame encoding; and
adjusting the quantization offset based on the quantization parameter, whether the pixel block is determined to be a reference block, and the type of encoding used to encode the pixel block.

5. The method as defined in claim 1, wherein the adjusting of the quantization offset includes:
setting the quantization offset based on the quantization parameter.

6. The method as defined in claim 1, wherein the adjusting of the quantization offset further includes adjusting the quantization offset based on the quantization parameter, whether the pixel block is determined to be a reference block, and a resolution of the frame of the video sequence.

7. The method as defined in claim 1, wherein the adjusting of the quantization offset further includes adjusting the quantization offset based on the quantization parameter, whether the pixel block is determined to be a reference block, and a characteristic of the pixel block, the characteristic indicating at least one of an amount of motion or an amount of texture detail associated with the pixel block.

8. The method as defined in claim 1, wherein the adjusting of the quantization offset includes dynamically adjusting the quantization offset on at least one of a frame-by-frame basis or a block-by-block basis.

9. A video encoder comprising:
an offset determiner implemented by at least one of hardware or at least one processor to:
    determine whether a pixel block in a frame of a video sequence is a reference block to be used to encode other pixel blocks; and
    adjust a quantization offset to quantize a transform coefficient representative of the pixel block, the offset determiner to adjust the quantization offset based on a quantization parameter to quantize the transform coefficient, the offset determiner also to:
    (i) increase a value of the quantization offset when the pixel block is determined to be a reference block, and (ii) decrease the value of the quantization offset when the pixel block is determined to not be a reference block; and a quantizer implemented by at least one of the hardware or the at least one processor to quantize the transform coefficient according to the quantization parameter and the quantization offset.

10. The video encoder as defined in claim 9, wherein the offset determiner is to dynamically adjust the quantization offset on at least one of a frame-by-frame basis or a block-by-block basis.

11. A method for video encoding, the method comprising:
determining, by executing an instruction with at least one processor, whether a pixel block in a frame of a video sequence to be encoded is a reference block to be used for encoding other pixel blocks;
adjusting, by executing an instruction with the at least one processor, a cost factor based on (i) a characteristic of the pixel block and (ii) whether the pixel block to be encoded is determined to be a reference block, the adjusting of the cost factor including:
decreasing a value of the cost factor when the pixel block is determined to be a reference block; and
increasing the value of the cost factor when the pixel block is determined to not be a reference block; and
determining, by executing an instruction with the at least one processor and based on the cost factor, a cost associated with encoding the pixel block according to a first encoding mode, the cost being a combination of a distortion value associated with the first encoding mode and a rate value associated with the first encoding mode, the rate value being scaled by the cost factor.

12. The method as defined in claim 11, wherein the characteristic indicates at least one of an amount of motion or an amount of texture detail associated with the pixel block.

13. The method as defined in claim 12, wherein the characteristic indicates the amount of motion associated with the pixel block, and the adjusting of the cost factor further includes:
setting the cost factor to a first value when the amount of motion associated with the pixel block satisfies a threshold amount of motion; and
setting the cost factor to a second value less than the first value when the amount of motion associated with the pixel block does not satisfy the threshold amount of motion.

14. The method as defined in claim 12, wherein the characteristic indicates the amount of texture detail associated with the pixel block, and the adjusting of the cost factor further includes:
setting the cost factor to a first value when the amount of texture detail associated with the pixel block satisfies a threshold; and
setting the cost factor to a second value less than the first value when the amount of texture detail associated with the pixel block does not satisfy the threshold.

15. The method as defined in claim 11, wherein the adjusting of the cost factor includes:
setting the cost factor based on the characteristic of the pixel block.

16. The method as defined in claim 11, wherein the adjusting of the cost factor further includes adjusting the cost factor based on the characteristic of the pixel block, whether the pixel block is determined to be a reference block, and a quantization parameter to quantize a transform coefficient representative of the pixel block.

17. The method as defined in claim 11, wherein the cost factor is dynamically adjusted on at least one of a frame-by-frame basis or a block-by-block basis.

18. A video encoder comprising:
a cost factor adjuster implemented by at least one of hardware or at least one processor to:
determine whether a pixel block in a frame of a video sequence to be encoded is a reference block to be used for encoding other pixel blocks; and
adjust a cost factor based on (i) a characteristic of the pixel block and (ii) whether the pixel block to be encoded is determined to be a reference block, the cost factor adjuster to: (a) decrease a value of the cost factor when the pixel block is determined to be a reference block, and (b) increase the value of the cost factor when the pixel block is determined to not be a reference block; and
a cost calculator implemented by at least one of the hardware or the at least one processor to determine, based on the cost factor, a cost associated with encoding the pixel block according to a first encoding mode, the cost being a combination of a distortion value associated with the first encoding mode and a rate value associated with the first encoding mode, the rate value being scaled by the cost factor.

19. The video encoder as defined in claim 18, wherein the cost factor adjuster is to dynamically adjust the cost factor on at least one of a frame-by-frame basis or a block-by-block basis.

20. The video encoder as defined in claim 9, wherein the quantization parameter corresponds to an index to identify a quantization step size.

21. The video encoder as defined in claim 20, wherein the offset determiner is to:
set the quantization offset to a first fraction of the quantization step size when the quantization step size is a first value; and
set the quantization offset to a second fraction of the quantization step size when the quantization step size is a second value, the second fraction being different from the first fraction.

22. The video encoder as defined in claim 18, wherein the characteristic indicates at least one of an amount of motion or an amount of texture detail associated with the pixel block.

23. The video encoder as defined in claim 18, wherein the cost factor adjuster is to adjust the cost factor based on (i) the characteristic of the pixel block, (ii) whether the pixel block is determined to be a reference block, and (iii) a quantization parameter to quantize a transform coefficient representative of the pixel block.

* * * * *